(12) United States Patent
Kawashima

(10) Patent No.: US 6,320,614 B1
(45) Date of Patent: *Nov. 20, 2001

(54) IMAGE COMMUNICATION APPARATUS FOR CONTROLLING A MECHANICAL MOTION OF A COMMUNICATION PARTNER

(75) Inventor: Masanori Kawashima, Yokosuka (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/595,654

(22) Filed: Feb. 2, 1996

(30) Foreign Application Priority Data

Feb. 3, 1995 (JP) .................................................. 7-016923
Jan. 26, 1996 (JP) .................................................. 8-012211

(51) Int. Cl.[7] .................................................. H04N 5/232
(52) U.S. Cl. .............................................. 348/213; 348/143
(58) Field of Search .................................... 348/207, 211, 348/212, 213, 222, 143, 333.01, 333.02, 333.05, 333.11, 333.12; 370/280, 519; H04N 5/232

(56) References Cited

U.S. PATENT DOCUMENTS 5,359,602 * 10/1994 Diaz et al. ........................... 370/85.8
5,748,234 * 5/1998 Lippincott .............................. 348/222
5,838,368 * 11/1998 Masunaga et al. .................... 348/211

* cited by examiner

Primary Examiner—Tuan Ho
(74) Attorney, Agent, or Firm—Fitzpatrick, Cella, Harper & Scinto

(57) ABSTRACT

An image communication apparatus generates a command, which controls a communication partner to cause a part of the communication partner to move mechanically, to be transmitted through a communication line. The apparatus further prevents the communication partner from operating incorrectly according to the command which is transmitted after a predetermined delay time of the communication line.

14 Claims, 15 Drawing Sheets

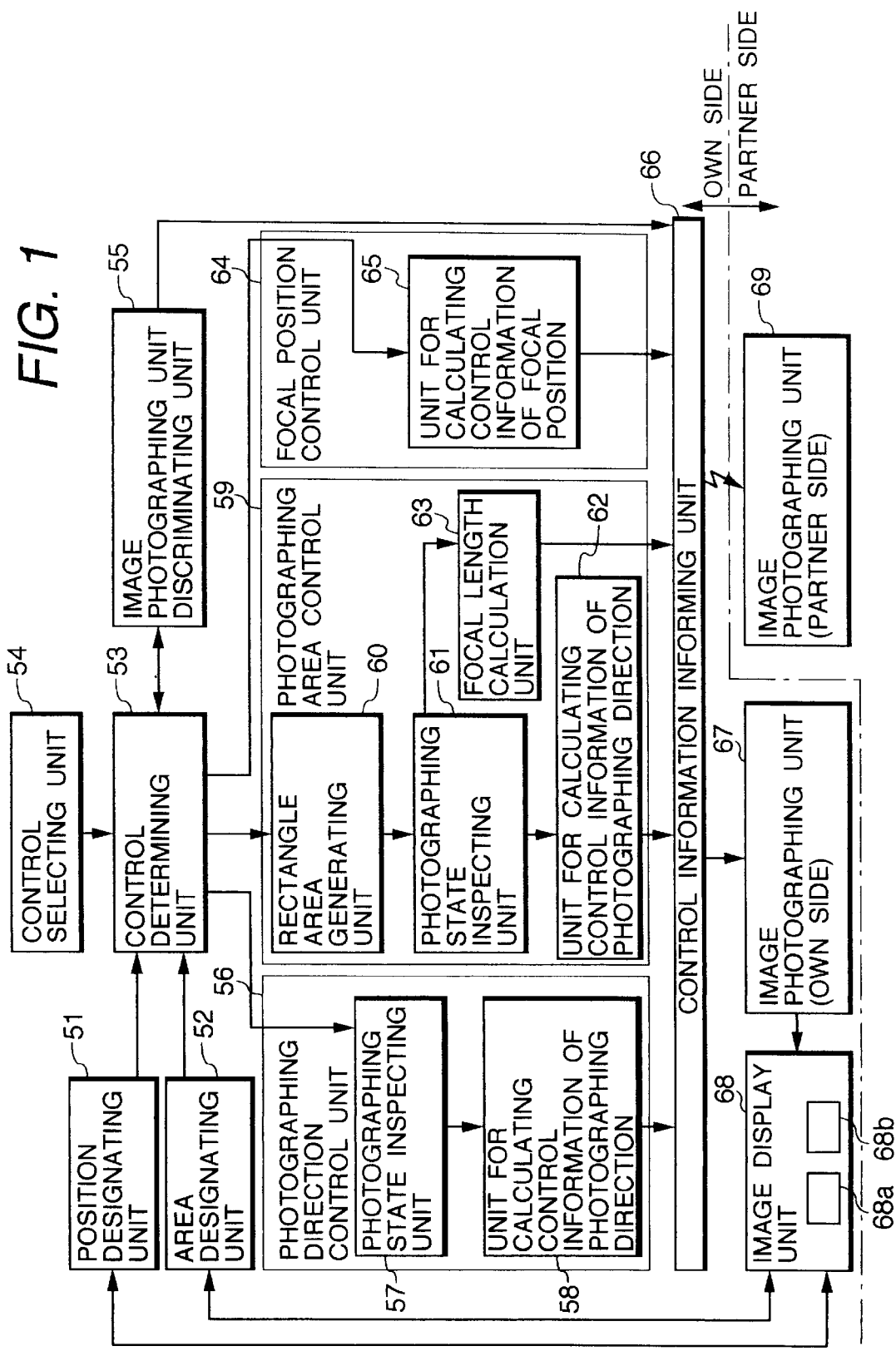

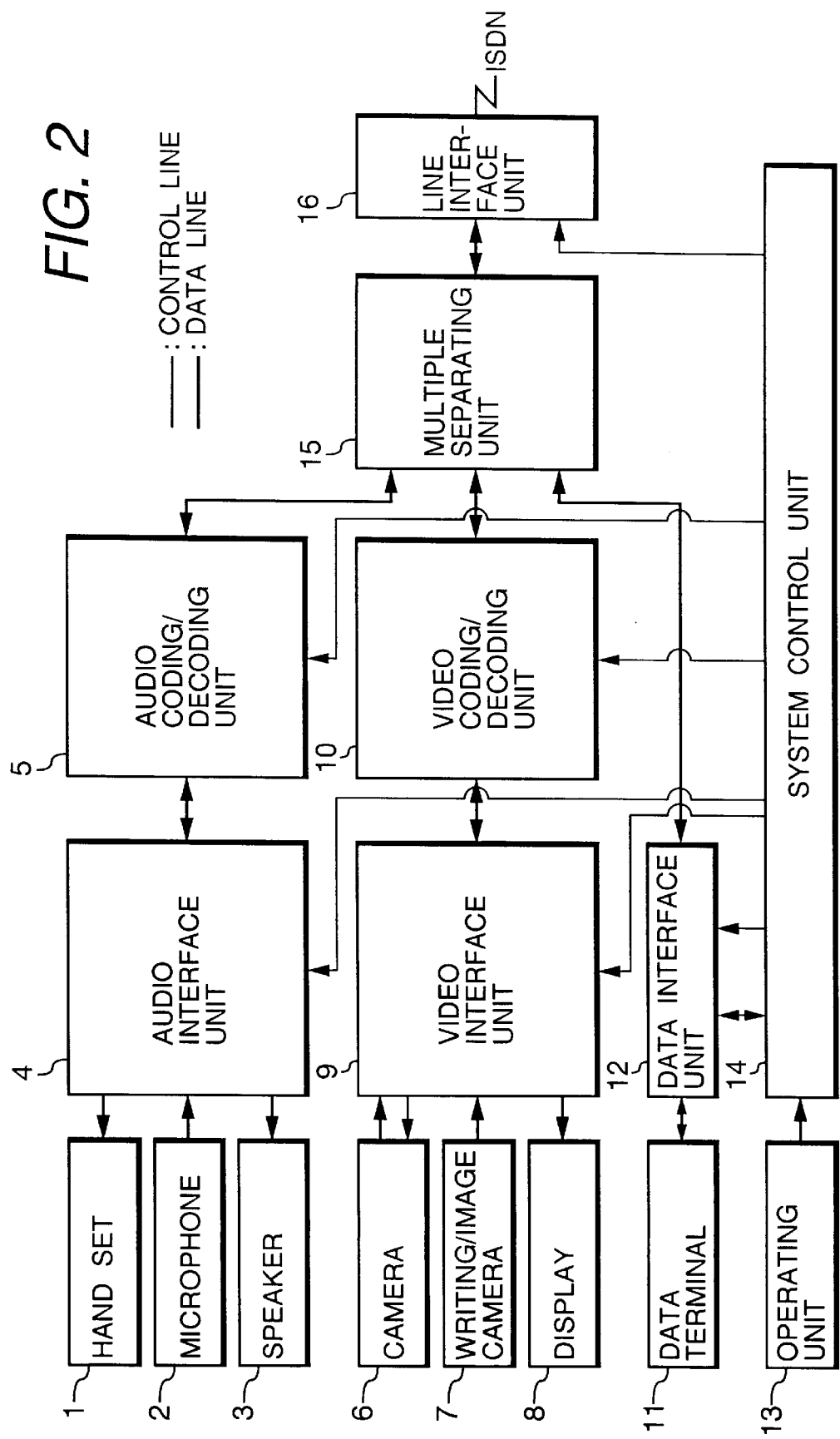

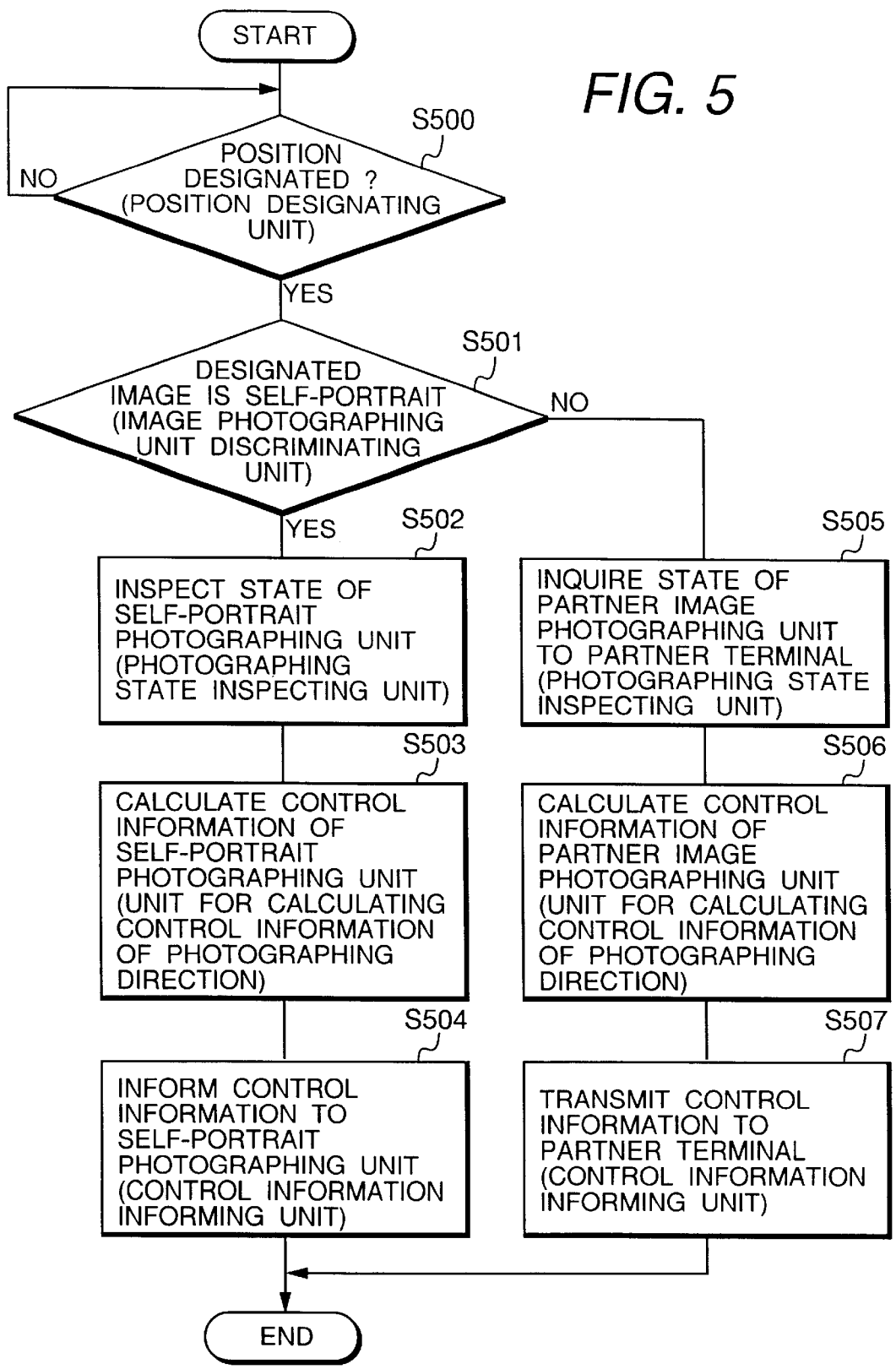

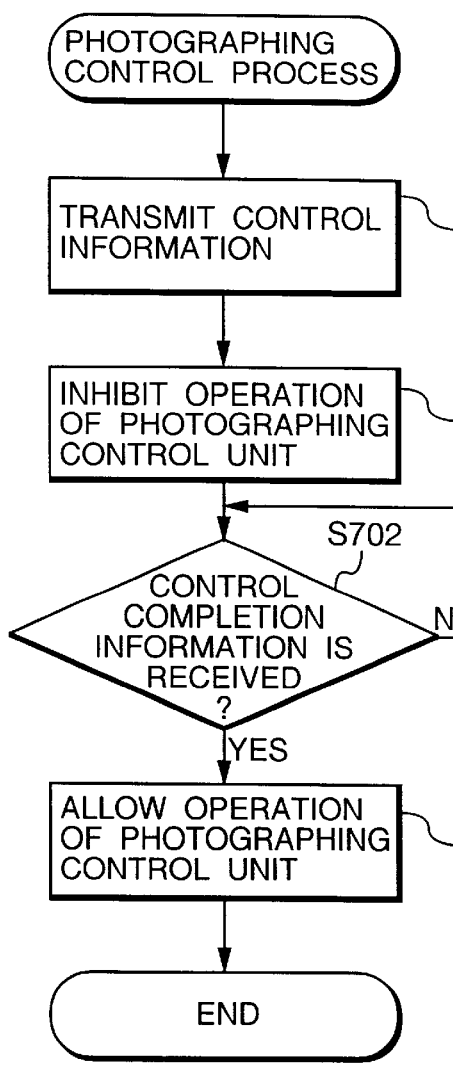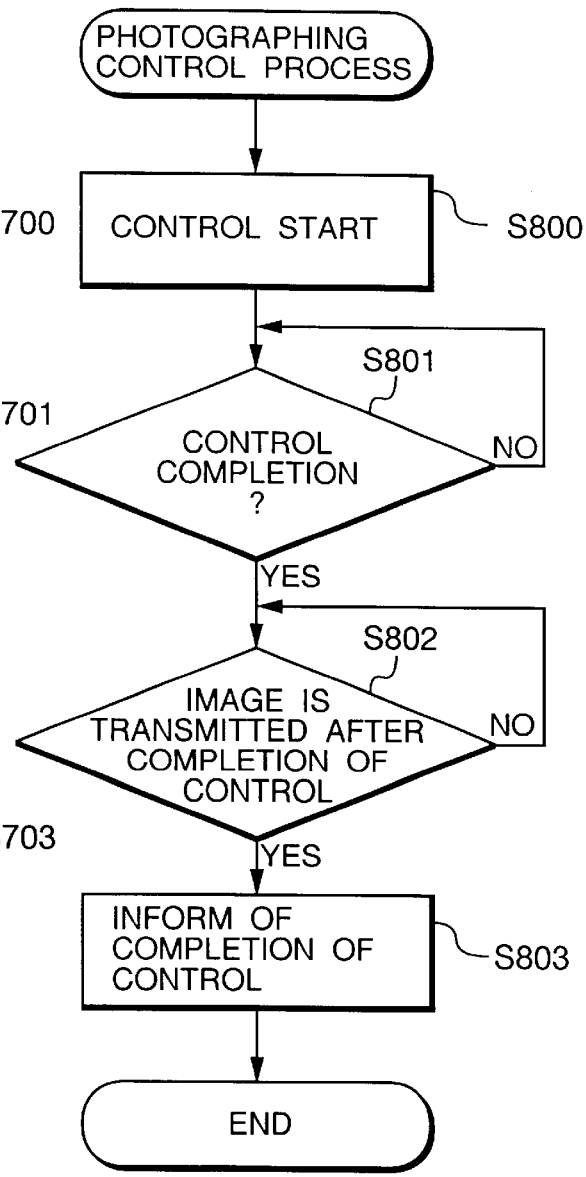

IMAGE COMMUNICATION APPARATUS FOR CONTROLLING A MECHANICAL MOTION OF A COMMUNICATION PARTNER

BACKGROUND OF THE INVENTION

1. Field of the Invention

The present invention relates to an image communication system, apparatus, and method for transmitting and receiving an image to and from remote sites over a digital communication line such as Integrated Service Digital Network (ISDN).

2. Related Background Art

With recent development of image compression and coding techniques as well as recent prevalence of high speed, high quality digital communication lines typically ISDN, various image communication systems have been developed which conform with Recommendations stipulated for audio video (AV) services such as television (TV) conference systems.

A TV conference system, a typical image communication system, is operated generally by preparing a TV conference room to have a conference with partners at a remote TV conference room. This conference is usually had by a plurality of participants in TV conference rooms in a multi-to-multi person style.

There are several methods of taking an image of a participant or participants in a TV conference room for the transmission of the image from its own TV conference terminal to a partner TV conference terminal. With one method, zooming of an image photographing unit (e.g., video camera) is set to a wide angle side to take the images of all participants, or with another method, a photographing unit with a tilting mechanism is used to take the image of a particular participant.

As one example of using the tilting mechanism of the photographing unit, a method has been proposed whereby a microphone is installed for each of all TV conference participants, the sound levels are checked, and the photographing unit is automatically moved toward the participant with the largest sound level. In most of TV conference systems, however, the tilting control of the photographing unit is performed by an operator who manipulates an operation console of the TV conference system.

Some image photographing units used by such a TV conference system can perform zooming control, focussing control as well as tilting control in the vertical and horizontal directions, in response to control information (command) supplied from the operation console. Further, some image photographing units have an automatic focussing function of automatically measuring a distance to an object and adjusting the focus of the object. Still further, some image photographing units have a plurality of range finding points on a photographing screen to adjust the focus of an arbitrary or particular object on the photographing screen.

In some TV conference systems and image photographing units having the same command system, the image photographing unit not only at the own side station but also at the partner side station can be controlled. In such TV conference systems, control information for the image photographing unit is transmitted to a TV conference terminal at the partner side station to control the image photographing unit at the partner side station.

In a TV conference system in which the image photographing unit is controlled by an operator who manipulates an operation console, for example, the direction of the image photographing unit is controlled by depressing tilt control keys (right, left, up, and down keys) of the image photographing unit. However, with this method, because the correspondence between the tilt direction of the image photographing unit and the tilt control key differs depending on the type of each TV conference system, the operator becomes confused in changing the photographing direction of the photographing unit at the own side station.

For example, consider the case where there are a window 100 (hereinafter called self-portrait display window) for displaying an image on the image display unit at the own side station and a window 101 (hereinafter called partner portrait display window) for displaying an image at a partner side station on the image display unit at the own side station. In this case, in order to move an object 103 displayed at the left of the partner portrait display window 101 to the center of the window 101, the photographing direction of the image photographing unit 105 at the partner side station (hereinafter called partner portrait photographing unit) is required to change to the direction indicated by an arrow 107. In this case, an operator usually depresses a "left key" of the tilt control keys.

On the other hand, in order to move an object 102 displayed at the left of the self-portrait display window 100 to the center of the window 100, the photographing direction of the image photographing unit 104 at the own side station (hereinafter called self-portrait photographing unit) is required to change to the direction indicated by an arrow 106.

Two types of manipulation by an operator of the tilt control keys may be had:

a) Depressing "left key", being coincident with the tilt direction as viewed from the self-portrait photographing unit 104, and b) Depressing "right key", being coincident with the tilt direction as views from the object 102.

In some TV conference systems, an operator can select either one of the two types, by setting the system to this effect.

As above, in a conventional TV conference system, because the correspondence between the tilt direction of the self-portrait photographing unit 104 and the tilt control key is different, the operator becomes confused in changing the photographing direction of the photographing unit.

Apart from the above, in controlling the partner portrait photographing unit 105 from the own side station, each time a key of the operation console at the TV conference terminal at the own side station is depressed, for example, each time the "left key" is depressed, a command such as "change the photographing direction of the partner portrait photographing unit 105) is transmitted over a communication line to the TV conference terminal at the partner side station. In response to this command, the photographing direction of the partner portrait photographing unit 105 is changed by an amount preset for this command. During or after this change, an image at the partner side station is transmitted over the communication line to the image display unit at the own side station, and displayed on the partner portrait display window 101.

After an operator depresses the control key for controlling the partner portrait photographing unit 105 at the TV conference terminal at the own side station, a new image reflecting this control is displayed on the partner portrait display window 101 at the own side station. During this period, there is a delay time in transferring a control command or image data and in coding and decoding an image. Therefore, an operator tends to depress the control key at the TV conference terminal at the own side station, more often than necessary, making difficult to change the direction of the partner portrait photographing unit 105 by a desired amount.

Such a problem occurs also in performing a zooming control of the partner portrait photographing unit 105 from the own side station. Specifically, after an operator depresses the zooming control key at the own side station, an image at the partner side station reflecting the control change is displayed on the partner portrait display window 101. During this period, there is a delay time so that it is difficult to zoom the image to a desired size.

Still further, if there are a plurality of participants in one TV conference room and a distance from the image photographing unit to each participant is different, it is necessary for a conventional TV conference system to manually adjust the focus, resulting in a complicated focus adjustment operation. Although an image photographing unit with an automatic focussing function is known, this unit automatically focusses to a participant located at the center of the display screen. Therefore, the participants other than the participant at the center of the display screen are out of focus and it is difficult to clearly discriminate between those participants.

Such a delay time is associated not only with the above-described controls but also, for example, with the case where an operator draws a desired image with a pointing device.

SUMMARY OF THE INVENTION

It is an object of the present invention to provide an image communication system, apparatus, and method capable of independently or collectively solving the above-described problems.

It is another object of the present invention to solve the problems associated with a response delay generated if a command is transmitted via a communication line.

In order to achieve the above objects, a preferred embodiment of the invention discloses an image communication apparatus comprising: means for generating a command, which controls a communication partner, to be transmitted through a communication line; and means for preventing the communication partner from operating incorrectly according to the command which is transmitted after a predetermined delay time of the communication line.

It is still another object of the invention to provide an image communication system and method capable of reliably controlling devices at a communication partner from the image transmission side.

It is another object of the present invention to provide an image communication apparatus for such a system achieving the above object.

It is a further object of the present invention to provide an image communication system easy to be used by an operator.

It is a still further object of the present invention to provide an image communication system achieving the above objects, capable of facilitating the control of devices at a communication partner by an operator.

It is another object of the present invention to provide a novel image communication system and apparatus.

The other objects and advantages of the present invention will become apparent from the following detailed description of the embodiments when read in conjunction with the accompanying drawings.

BRIEF DESCRIPTION OF THE DRAWINGS

FIG. 1 is a block diagram showing the main circuit portions of the invention.

FIG. 2 is a block diagram showing the structure of a TV conference system according to an embodiment of the invention.

FIG. 5 is a flow chart illustrating the process of controlling the photographing direction of the self-portrait or partner portrait photographing unit when a position is designated on the self-portrait or partner portrait display window of the TV conference system of this embodiment.

FIG. 15 is a flow chart illustrating a process flow when control information is inputted from the photographing control unit while the photographing control inhibition unit is controlled by the control completion informing unit in the TV conference system of this embodiment.

FIG. 16 is a flow chart illustrating an operation when control information is inputted from the photographing control unit while the photographing control inhibition unit is controlled by the control completion informing unit in the TV conference system of this embodiment.

DETAILED DESCRIPTION OF THE PREFERRED EMBODIMENTS

Figure 3A:
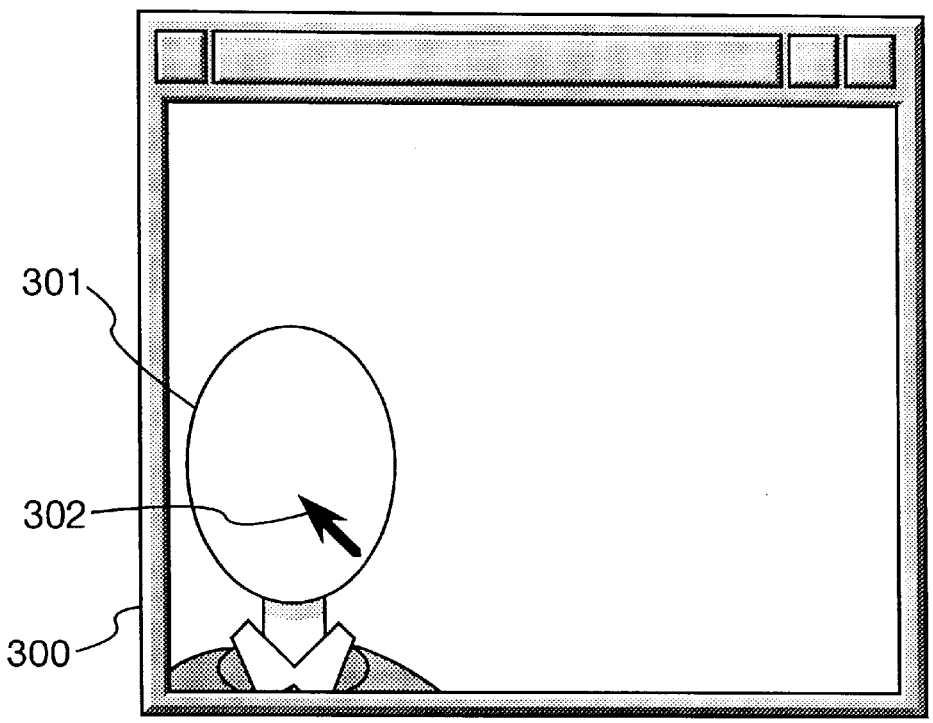
FIGS. 3A and 3B are diagrams illustrating the operation of the control of a photographing direction of the TV conference system according to the embodiment.

FIG. 1 is a block diagram showing the main circuit portions of the invention.

Referring to FIG. 1, an image communication system at the own side station is constituted by an image communication apparatus having a self-portrait photographing unit 67 and an image display unit 68 and other units 51 to 66. The image communication system includes other various units shown in FIG. 2 which are not depicted in FIG. 1.

An image communication system at the partner side station is constructed in the similar manner to the system at the own side station, only a partner side station image photographing unit 69 for taking an image on the partner side station being shown in FIG. 1. Image data and a plenty of control information are transmitted and received between own side and partner side stations to perform, for example, a TV conference.

Referring to FIG. 1, a position designating unit 51 designates an arbitrary point on an image displayed on the image display unit 68. An area designating unit 52 designates an arbitrary area on an image displayed on the image display unit 68. These position and area designating units 51 and 52 are used for changing the photographing state (photographing direction, photographing area, photographing position, and so on) of the photographing units 67 and 69 at the own side and partner side stations.

A control determining unit 53 determines a designation of a point or area by the position or area designating unit 51 or 52, and also determines a selection of a particular control, if any, by a control selecting unit 54. The control selecting unit 54 selects one of controls respectively made by a photographing direction control unit 56, a photographing area control unit 59, and a focal position control unit 64.

An image photographing unit discriminating unit 55 discriminates between the image photographing units, the discriminated image photographing unit having the image display unit on which an image having a point or area designated by the position or area designating unit 51 or 52 is displayed.

For example, consider both a self-portrait display window 68a for displaying an image at the own side station on the image display unit 68 and a partner portrait display window 68b for displaying an image at the partner side station on the image display unit 68 are displayed. In this case, the image photographing unit discriminating unit 55 discriminates between the self-portrait photographing unit 67 taking the image on the self-portrait display window 68a and the partner portrait photographing unit 69 taking the image on the partner portrait display window 68b. That is, the image photographing unit discriminating unit 55 discriminates between the self-portrait display window 68a and partner portrait display window 68b, the discriminated one having a designated point or area. If there is a plurality of image display units at the own side or partner station, the unit 55 also discriminates an image display unit on which display unit a point or area on an image has been designated, from other display units.

In accordance with the determination result of the control determining unit 53 and the discrimination result of the image photographing unit discriminating unit 55, one of the photographing direction control unit 56, photographing area control unit 59, focal position control unit 64 performs its control and calculates control information for the control of the corresponding image photographing unit.

In accordance with the determination result of the control determining unit 53 and the discrimination result of the image photographing unit discriminating unit 55, the photographing direction control unit 56 calculates control information for changing the photographing direction of the self-portrait photographing unit 67 or partner portrait photographing unit 69 right, left, up, or down. For example, in calculating control information for the self-portrait photographing unit 67, first, a photographing state inspecting unit 57 inspects the current photographing state of the self-portrait photographing unit 67.

In accordance with the information of the photographing state of the self-portrait photographing unit 67 obtained through the inspection by the photographing state inspecting unit 57, a photographing direction control information calculation unit 58 calculates control information for changing the photographing direction of the self-portrait photographing unit 67 so as to move a point designated by the position designating unit 51 to the center of the self-portrait display window 68a. The details of calculating this control information will be later given.

In calculating control information for the partner portrait photographing unit 69, the photographing state inspecting unit 57 inspects the current photographing state of the partner portrait photographing unit 69 instead of the self-portrait photographing unit 67. The other operations are similar to the above.

In accordance with the determination result of the control determining unit 53 and the discrimination result of the image photographing unit discriminating unit 55, the photographing area control unit 59 calculates control information (control information for zooming) for controlling the self-portrait photographing unit 67 or partner portrait photographing unit 69. For example, in calculating control information for the self-portrait photographing unit 67, first a rectangle area generating unit 60 generates a rectangle area including an area designated by the area designating unit 52.

Then, assuming that the center of the rectangle area is the point designated by the position designating unit 51, a photographing state inspecting unit 61 and a photographing direction control information calculating unit 62 calculate control information for changing the photographing direction of the self-portrait photographing unit 67 so as to move the center of the rectangle area to the center of the self-portrait display window 68a, similar to the operations made by the photographing state inspecting unit 57 and the photographing direction control information calculating unit 58. A focal length calculating unit 63 calculates control information for changing the focal length so as to make the size of the rectangle area equal to the size of the self-portrait display window 68a.

In accordance with the determination result of the control determining unit 53 and the discrimination result of the image photographing unit discriminating unit 55, the focal position control unit 64 calculates control information for controlling the focal position of the self-portrait photographing unit 67 or partner portrait photographing unit 69. For example, in calculating control information for the self-portrait photographing unit 67, a focal position control information calculating unit 65 calculates control information for setting the focal position of the self-portrait photographing unit 67 to the point designated by the position designating unit 51.

The control information calculated by the photographing direction control unit 56, photographing area control unit 59, and focal position control unit 64 in the above manner is supplied to a control information informing unit 66. In accordance with the discrimination result of the image photographing unit discriminating unit 55, the control information informing unit 66 informs the self-portrait photographing unit 67 or partner portrait photographing unit 69 of the control information. The control information is transmitted via a communication line to the image photographing unit 69 of the image communication system at the partner side station.

In accordance with the notified control information, the self-portrait photographing unit 67 and the partner portrait photographing unit 69 execute a process for changing a photographing state (photographing direction, photographing area, focal position, and so on). The image photographing units 67 and 69 include an unrepresented controller which receives the control information and executes the change process for the photographing state.

An image taken by the self-portrait photographing unit 67 is displayed on the self-portrait display window 68a, and on an unrepresented image display unit at the partner side station via the communication line. An image taken by the partner portrait photographing unit 69 is displayed on the unrepresented display unit at the partner side station, and on the partner portrait display window 68b at the own side station via the communication line.

As above, only by designating a point or area on an image displayed on the self-portrait display window 68a or the partner portrait display window 68b, the photographing state (photographing direction, photographing area, focal position, and so on) of the image photographing unit 67 or 69 taking the image can be controlled reliably, while presenting easy operation of each control.

In controlling the photographing state of the partner portrait photographing unit 69 from the own side station, a delay time from a designation of a point or area to a display of a designation reflected new image on the partner portrait display window 68b poses no practical problem. Specifically, if an operator designates a position or area on the partner portrait display window 68b at the own side station relative to which the photographing direction, photographing area, focal position, and so on are changed, the photographing state of the partner portrait photographing unit 69 can be automatically changed in accordance with the designated point or area information. Therefore, each control of the photographing direction, photographing area, or focal position can be made easily while satisfying the intention of the operator.

FIG. 2 is a block diagram showing the structure of a TV conference system according to an embodiment of the invention.

Referring to FIG. 2, reference numeral 1 represents a handset which is one of audio input/output devices, reference numeral 2 represents a microphone which is one of the audio input/output devices, and reference numeral 3 represents a speaker which is one of the audio input/output devices. Reference numeral 4 represents an audio interface unit which performs a switching process between the handset 1, microphone 2, and speaker 3 and a detecting process of an on/off-hook state of the handset 1, under the control of a system controller 14.

Reference numeral 5 represents an audio coding/decoding unit which executes a coding process of an audio transmission signal and a decoding process of an audio reception signal under the control of the system controller 14, in accordance with audio signal coding/decoding algorithms such as 64 kbps PCM A-law, 64 kbps PCM μ-law, 64 kbps/56 kbps/48 kbps SB-ADPCM, 32 kbps ADPCM, 16 kbps (e.g., APC-AB), and 8 kbps.

Reference numeral 6 represents a camera which is one of image photographing units. Control information is supplied to this camera 6 to enable the control of photographing direction, zooming, focal position adjustment, and the like. Reference numeral 7 represents a writing/image camera which is one of the image photographing units and is used for taking an image of a resource such as a document to be used for conference.

Reference numeral 8 represents a display which is one of image display units and is used for displaying an image from the camera 6 or writing/image camera 6 or an image received from the TV conference system at the partner side station via the communication line, on the self-portrait display window or the partner portrait display window.

Reference numeral 9 represents a video interface unit which executes various processes, such as a switching process between display screens, a synthesizing process of image signals, and a photographing direction controlling process of controlling the photographing direction of the image photographing unit, under the control of the system controller 14. Reference numeral 10 represents a video coding/decoding unit which executes a coding process of a video transmission signal and a decoding process of a video reception signal in accordance with ITU-T Recommendations H.261.

Reference numeral 11 represents a data terminal. Reference numeral 12 represents a data interface unit which transfers transmission data from the data terminal 11 or system controller 14 to a multiple separating unit 15, or reception data from the partner side station to the data terminal 11 or system controller 14. Reference numeral 13 represents an operating unit which is used for inputting control information for the various controls of this system. The operating unit 13 has, for example, a keyboard, a coordinate input device (such as mouse and tablet), and other devices.

The system controller 14 has a CPU, a ROM, a RAM, and other storage devices and supervises and controls the whole system. In accordance with ITU-T Recommendations H.221, the multiple separating unit 15 converts an audio signal from the audio coding/decoding unit 5, a video signal from the video coding/decoding unit 10, and a data signal from the data interface unit 12, into a BAS (bit rate assignment signal), and executes a multiplex process in the unit of transmission frame. It also executes a separation process in the unit of reception frame by separating signals into audio, video, and data signals and supplying these separated signals to the audio coding/decoding unit 5, video coding/decoding unit 10, and data interface unit 12.

Reference numeral 16 represents a line interface unit which is connected to the communication line such as ISDN and controls the line under the control of the system controller 14 in accordance with an ISDN user-net interface.

Local and remote TV conference systems having the structure described above are interconnected together by an ISDN communication line to transfer audio, video, and control information to conduct a TV conference.

The video interface unit 9 and system control unit 14 constitute the control determining unit 53, image photographing unit discriminating unit 55, photographing direction control unit 56, photographing area control unit 59, focal position control unit 64, and control information informing unit 66.

Figure 3B:
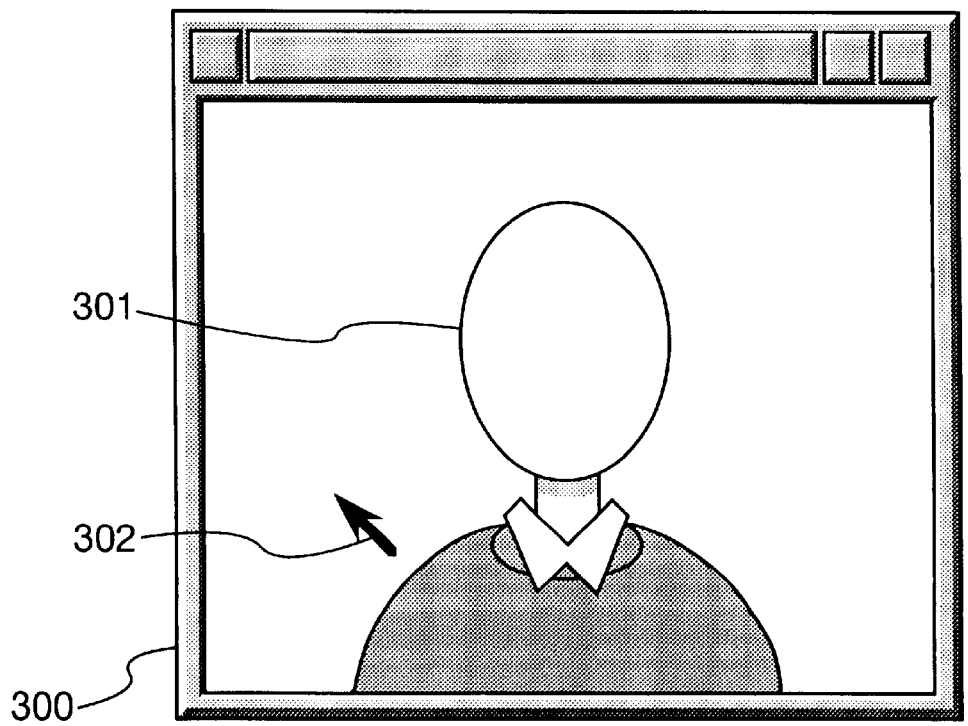

FIGS. 3A and 3B are diagrams illustrating the operation of the control of a photographing direction of the camera 6 of the TV conference system of this embodiment.

Referring to FIGS. 3A and 3B, reference numeral 300 represents an image display window which is one of the image display devices, reference numeral 301 represents an object photographed by the camera 6, and reference numeral 302 represents a pointing cursor for pointing an arbitrary point on the image displayed on the image display window 300.

Consider now changing the photographing direction of the camera 6 so as to move an object 301 at the position shifted from the center of the image display window 300 as shown in FIG. 3A to the center of the image display window 300 as shown in FIG. 3B. In the TV conference system of this embodiment, the photographing direction of the camera 6 can be automatically changed by designating the face of the object 301 to be moved to the center of the image display window 300, with the pointing cursor 302 or upon an instruction by the cursor 302, e.g., a click if the cursor 302 is constituted by a mouse.

Figure 4:
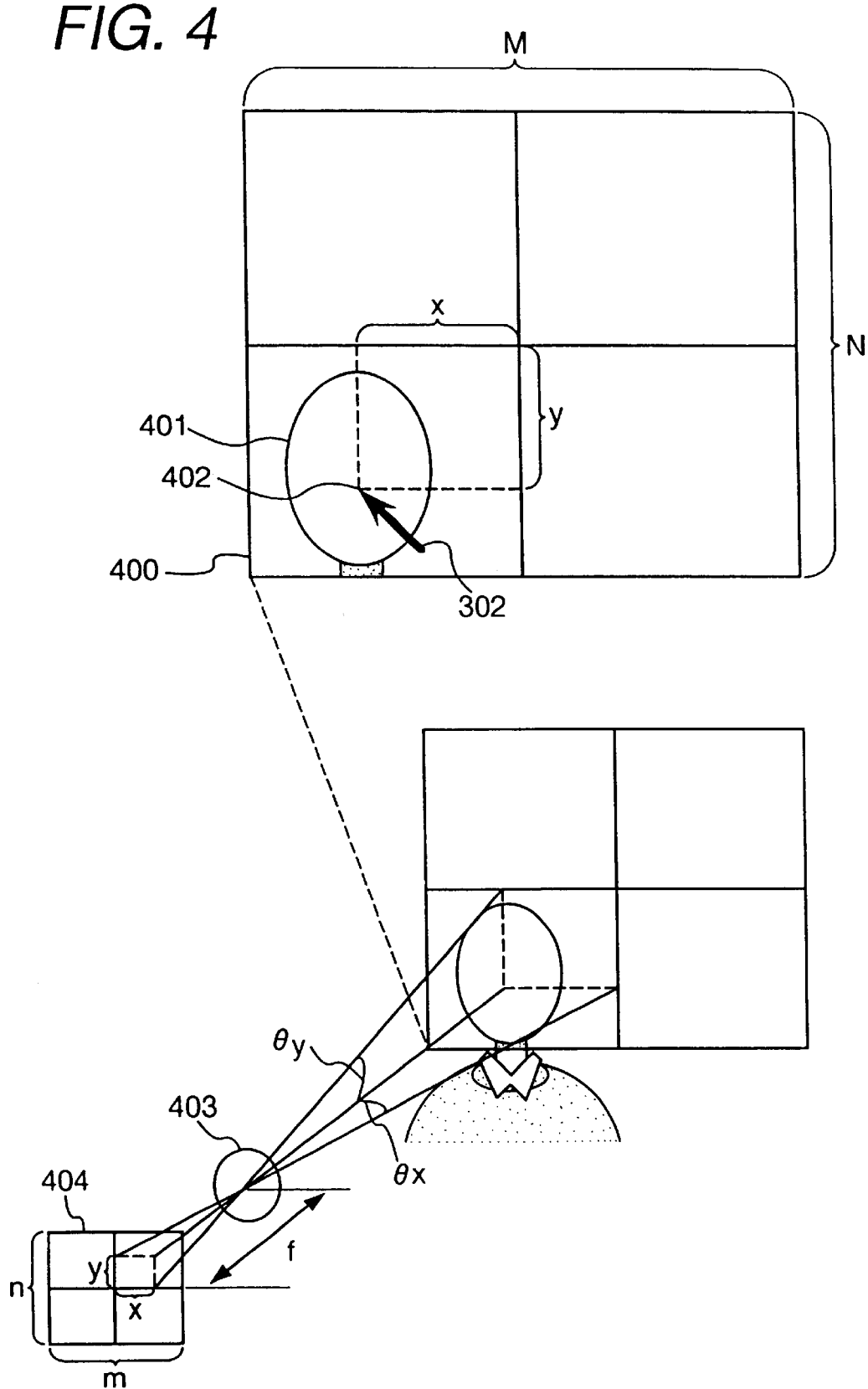
FIG. 4 is a diagram illustrating an example of a method of calculating control information of a photographing direction in the TV conference system according to the embodiment.

FIG. 4 is a diagram illustrating an example of a method of calculating control information of a photographing direction of the camera 6 in the TV conference system of this embodiment.

Referring to FIG. 4, reference numeral 400 represents an image display window, reference numeral 401 represents an object photographed by the camera 6, reference numeral 402 represents a point on the image display window 400 designated with the pointing cursor 302, reference numeral 403 represents a lens of the camera 6, and reference numeral 404 represents a focussed image taken by the camera 6.

In this embodiment, in accordance with the designated point 402 on the image display window 400 and the state of the camera 6, the photographing direction control information of the camera 6 is calculated so as to move the object 401 designated by the point 402 to the center of the image display window 400. An example of the calculation method will be described below.

First, for the photographing direction control information of the camera 6 in the horizontal direction, a tilt angle $\theta_x$ in the horizontal direction of the photographing direction of the camera 6 shown in FIG. 4 is calculated.

The tilt angle $\theta_x$ in the horizontal direction of the photographing direction of the camera 6 can be given by the following equation (1):

$$\tan \theta_x = MX/mf$$
$$\theta_x = \tan^{-1}(MX/mf) \quad (1)$$

where f is a focal length from the lens 403 to the focussed image 404, M is a horizontal width of the image display window 400, X is a horizontal distance from the center of the image display window 400 to the designated point 402, m is a horizontal width of the focussed image, and x is a horizontal distance from the center of the focussed image 404 to the point corresponding to the designated point 402.

In the similar manner, for the photographing direction control information of the camera 6 in the vertical direction, a tilt angle $\theta_y$ in the vertical direction of the photographing direction of the camera 6 shown in FIG. 4 is calculated.

The tilt angle $\theta_y$ in the vertical direction of the photographing direction of the camera 6 can be given by the following equation (2):

$$\tan \theta_y = NY/nf$$
$$\theta_y = \tan^{-1}(NY/nf) \quad (2)$$

where N is a vertical width of the image display window 400, Y is a vertical distance from the center of the image display window 400 to the designated point 402, n is a vertical width of the focussed image, and y is a vertical distance from the center of the focussed image 404 to the point corresponding to the designated point 402.

FIG. 5 is a flow chart illustrating the process of controlling the photographing direction of the self-portrait or partner portrait photographing unit when a position is designated on the self-portrait or partner portrait display window of the TV conference system of this embodiment. The process illustrated in this flow chart will be described with reference to the block diagram shown in FIG. 1.

Referring to FIG. 1, first at Step S500 the control determining unit 53 determines whether the position designating unit 51 has designated the photographing direction of either the self-portrait display window 68a or partner portrait display window 68b. If designated, the flow advances to Step S501, and if not, the flow repeats the process at Step S500.

At Step S501 the image photographing unit discriminating unit 55 discriminates between the own side station and the partner side station, at the discriminated one the image photographing unit taking the image displayed on the designated window. If the image displayed on the designated window is taken at the own side station, the flow advances to Step S502, and if not, the flow advances to Step S505.

At Step S502 the photographing state inspecting unit 57 inspects the current state of the self-portrait photographing unit 67, the current state including, for example, the focal length f from the lens 403 to the center of the focussed image 404, the vertical and horizontal widths from the center of the image display window 400 to the designated point 402, and other parameters shown in FIG. 4. Next, at Step S503 the photographing direction control information calculating unit 58 calculates control information for changing the photographing direction of the self-portrait photographing unit 67 in the manner described with FIG. 4, in accordance with the position of the point on the self-portrait display window 68a designated at Step S500 and the state of the self-portrait photographing unit 67 inspected at Step S502.

At Step S504 the control information informing unit 66 informs the self-portrait photographing unit 67 of the photographing direction control information of the self-portrait photographing unit 67 calculated at Step S503. In accordance with the photographing direction control information, the photographing direction is changed in the vertical direction so as to move the object to the center of the self-portrait display window 68a.

On the other hand, at Step S505 following Step S501, the photographing state inspecting unit 57 inspects the current state of the partner portrait photographing unit 69. The current state of the partner portrait photographing unit 69 can be given by requesting it from the TV conference terminal at the partner side station via the communication line.

Next, at Step S506 the photographing direction control information calculating unit 58 calculates control information for changing the photographing direction of the partner portrait photographing unit 69 in the manner described with FIG. 4, in accordance with the position of the point on the partner portrait display window 68b designated at Step S500 and the state of the partner portrait photographing unit 69 inspected at Step S505.

At Step S507 the control information informing unit 66 transmits the photographing direction control information of the partner portrait photographing unit 69 calculated at Step S506 to the TV conference terminal at the partner side station over the communication line. The partner portrait photographing unit 69 changes the photographing direction in the vertical and horizontal directions in accordance with the photographing direction control information received from the TV conference terminal at the own side station.

An image at the partner side station while changing the photographing direction or after the photographing direction change, is supplied via the communication line to the image display unit 68 at the own side station and displayed on the partner portrait display window 68b.

Figure 6A:
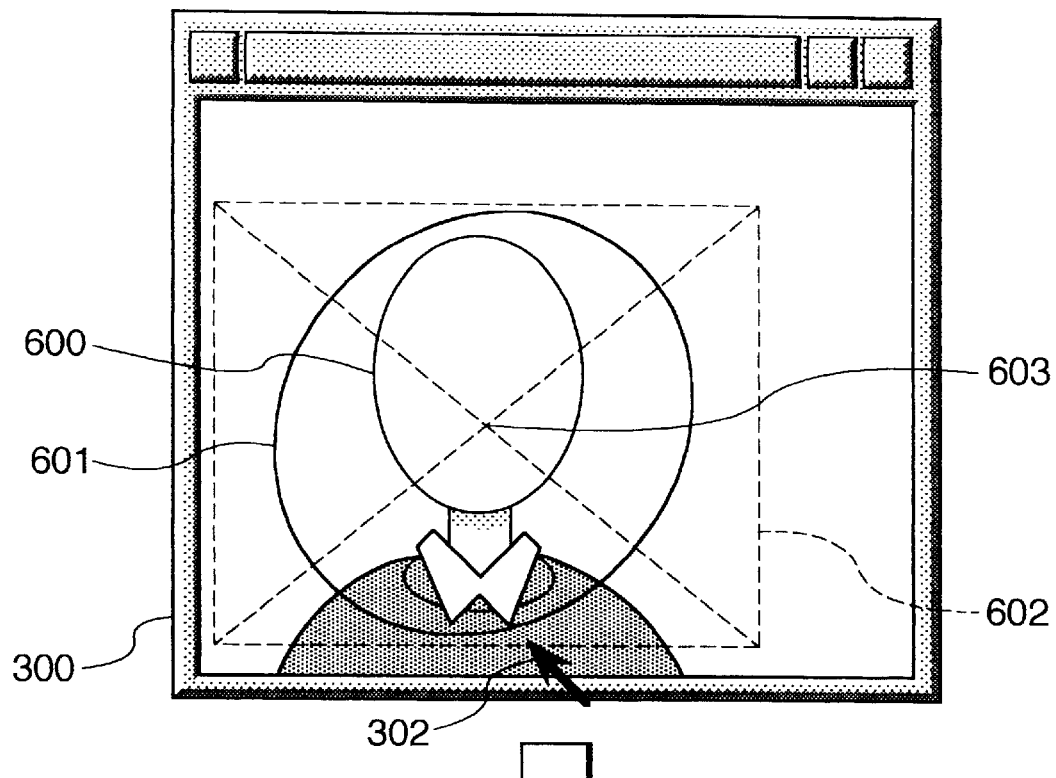
FIGS. 6A and 6B are diagrams illustrating the operation of controlling the photographing area in the TV conference system according to the embodiment.
Figure 6B:
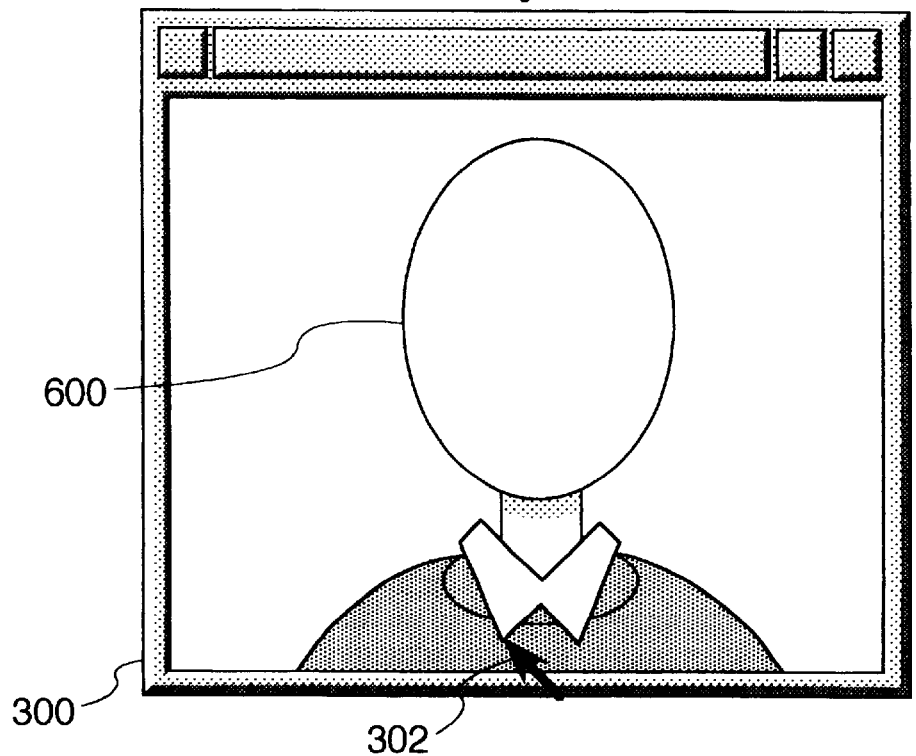

FIGS. 6A and 6B are diagrams illustrating the operation of controlling the photographing area of the camera 6 in the TV conference system of the embodiment.

Referring to FIGS. 6A and 6B, reference numeral 600 represents an object photographed by the camera 6, reference numeral 601 represents an area on the image display window 300 designated with the pointing cursor 302, reference numeral 602 represents a rectangle area including the designated area 601, the rectangle area having the same aspect ratio as the photographing area of the camera 6, and reference numeral 603 represents the center of the rectangle area 602.

In the TV conference system of this embodiment, when the area 601 is designated with the pointing cursor 302 as shown in FIG. 6A, the rectangle area 602 including the area 601 is generated. Similar to the photographing direction control procedure described with reference to FIGS. 3A and 3B and FIG. 4, the photographing direction of the camera 6 is changed to the direction toward the center 603 of the rectangle area 602. Similar to the calculation method described with reference to FIG. 4, the focal length f is calculated in order to focus the image 404 on the rectangle area 602 to thereby automatically perform a zooming process for the designated area 601 as shown in FIG. 6B.

Figure 7A:
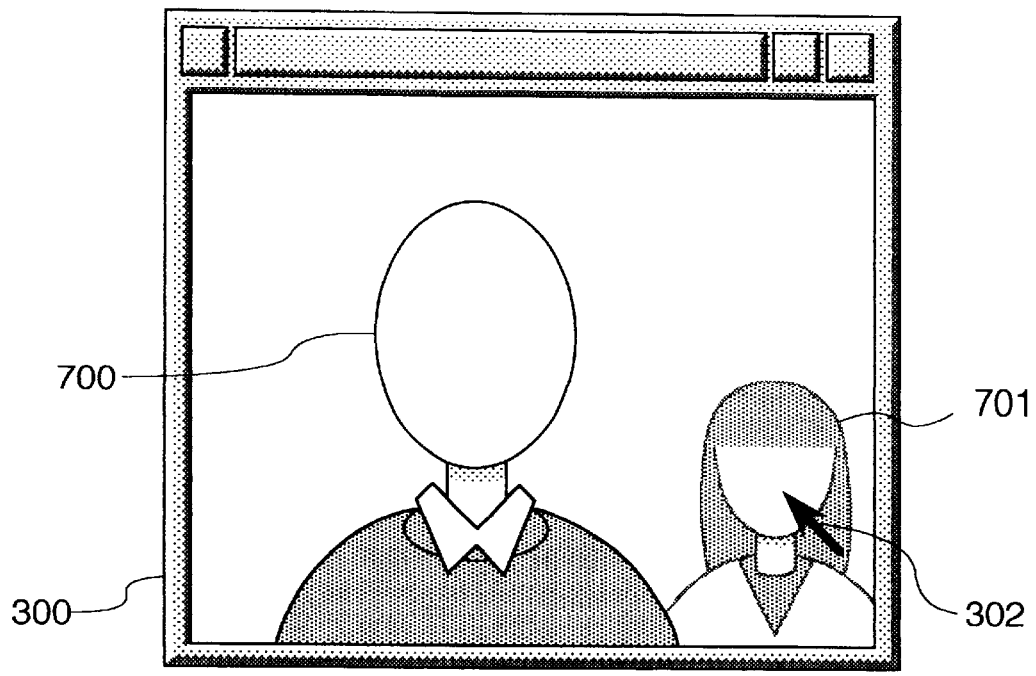
FIGS. 7A and 7B are diagrams illustrating the operation of controlling the focal position in the TV conference system according to the embodiment.
Figure 7B:
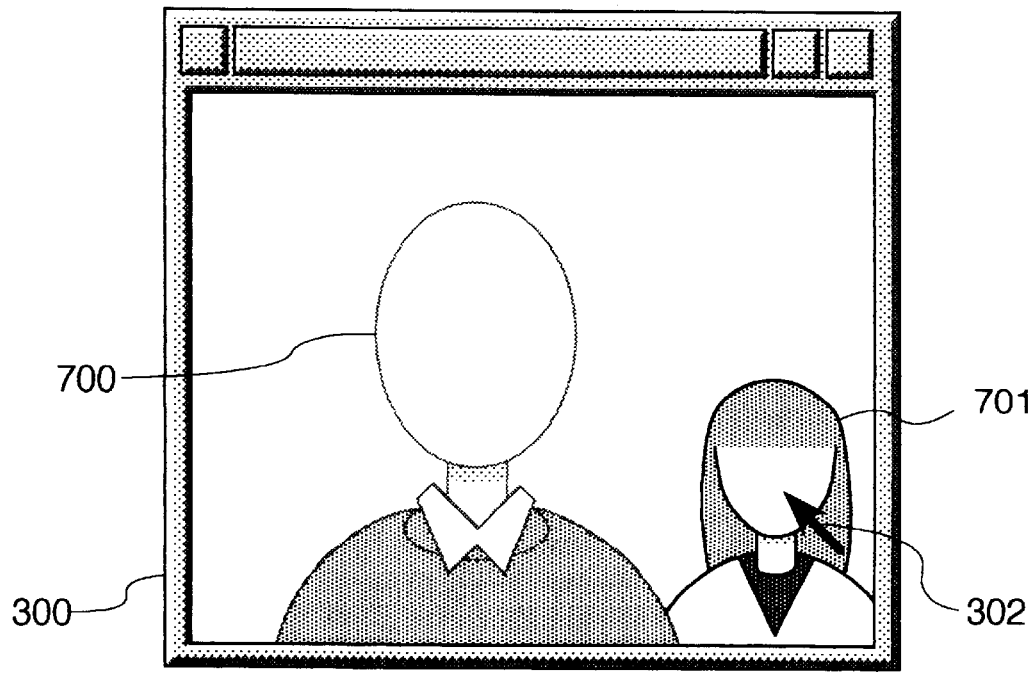

FIGS. 7A and 7B are diagrams illustrating the operation of controlling the focal position of the camera 6 in the TV conference system of the invention.

Referring to FIGS. 7A and 7B, reference numeral 700 represents an object at the near position from the camera 6, and reference numeral 701 represents an object at a far position from the camera 6.

In the TV conference system of this embodiment, the focal length is set to the object 700 at the center of the photographing area at the initial stage as shown in FIG. 7A, similar to a conventional TV conference system.

In the TV conference system of this embodiment, as shown in FIG. 7A, as the object 701 at the position shifted from the center of the photographing area of the camera 6 is designated with the pointing cursor 302, the range finding of the designated point is carried out, and in accordance with the range finding result, the focus of the object 701 is automatically set as shown in FIG. 7B. This range finding of the designated point can be performed by a known method commonly used by video cameras.

Figure 8:
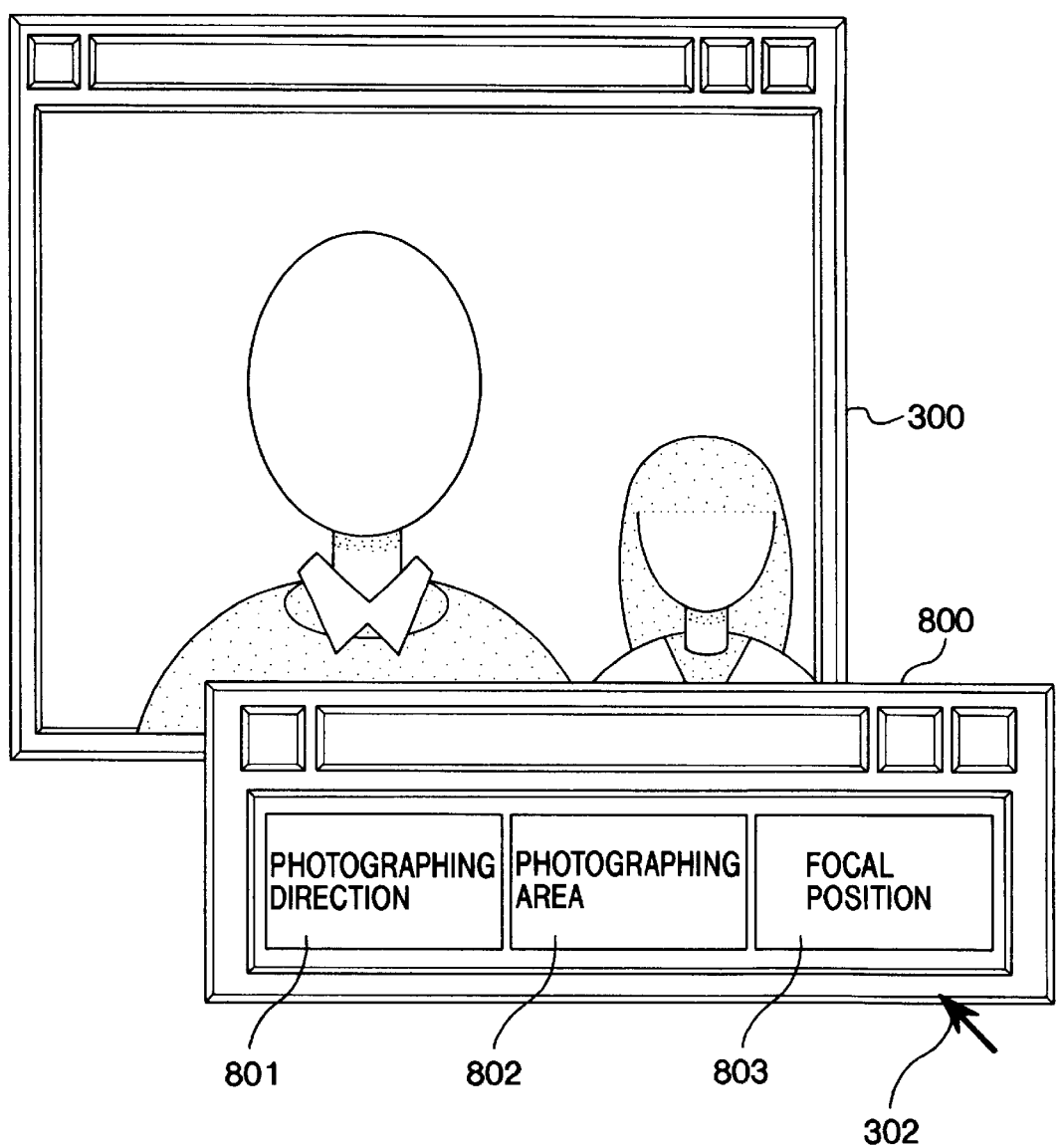
FIG. 8 is a diagram illustrating a control selection operation for the image photographing unit in the TV conference system according to the embodiment.

FIG. 8 is a diagram illustrating a control selection operation for the camera 6 for selecting a particular control when a plurality of control command are given to the camera 6 by designating an arbitrary position or area on the image display unit in the TV conference system of this embodiment.

FIG. 8 shows an example of an image displayed on the image display unit. Referring to FIG. 8, reference numeral 800 represents a control selection window for the camera 6, reference numeral 801 represents a photographing direction control selection button for the camera 6, reference numeral 802 represents a photographing area control selection button for the camera 6, and reference numeral represents a focal position control selection button for the camera 6.

Referring to FIG. 8, one of the three control selection buttons 801 to 803 on the control selection window 800 is depressed by using the pointing cursor 302, and then an arbitrary position or area on the image display window 300 is designated to activate the control sequence corresponding to the depressed button.

Specifically, when the photographing direction control selection button 801 is depressed, the control sequence for the photographing direction described with reference to FIGS. 3A and 3B is activated, and when the photographing area control selection button 802 is depressed, the control sequence for the photographing area described with reference to FIGS. 6A and 6B is activated. When the focal position control selection button 803 is depressed, the control sequence for the focal position described with reference to FIGS. 7A and 7B is activated.

In this embodiment, when a position or area is designated on the image display unit like the display 8, control information for changing the photographing direction or area of the image photographing unit like the camera 6 is calculated for the designated position or area. Instead, the image display unit may be divided into small blocks. In this case, the control information of the image photographing unit for each divided block is stored in a table and the calculation of the control information is replaced by a reference operation to the control information table.

Figure 9:
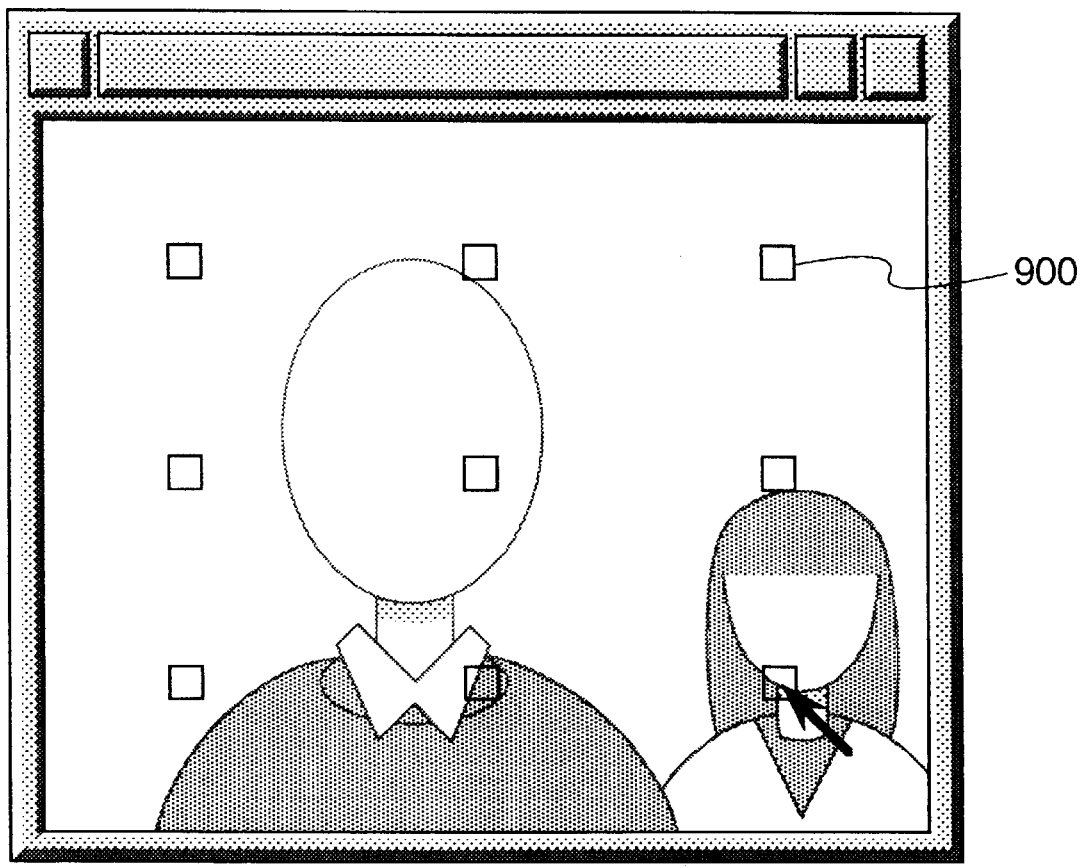
FIG. 9 is a diagram showing an example of a display on the image display unit on which selectable focal positions are displayed for the control of a focal position in the TV conference system according to the embodiment.
Figure 10:
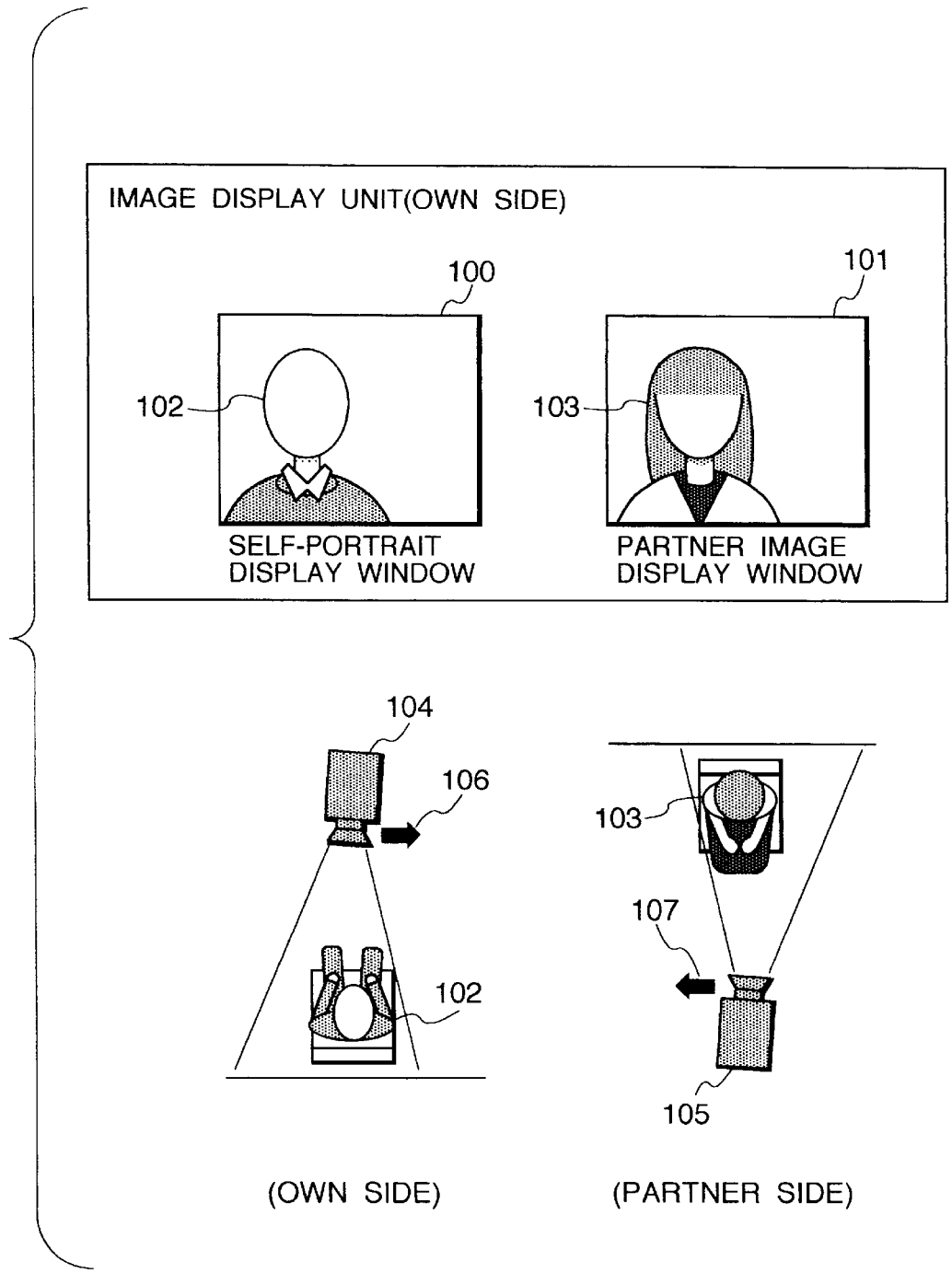
FIG. 10 is a diagram illustrating the control operation for the photographing direction of the image photographing unit in a conventional TV conference system.

Still further, in the above embodiment, a focal position is adjusted relative an arbitrary point designated on the image display unit. Instead, as shown in FIG. 9, a plurality of selectable range finding points 900 may be displayed on the image display unit. In this case, when one of the plurality of range finding points is designated, the focal position control is performed for the designated range finding point 900.

As described above, the TV conference system of this embodiment includes designating means for designating an arbitrary point or area on an image displayed on an image display unit, control information generating means for generating control information for changing the photographing state of an image photographing unit in accordance with the information of the point or area designated by the designating means, and control information informing means for informing the image photographing unit of the control information generated by the control information generating unit. Accordingly, only by designating a desired point or area on an image, the photographing state of the image photographing unit can be controlled, facilitating the manipulation required for the control of the photographing state.

Further, the TV conference system further includes position designating means for designating an arbitrary point on an image displayed on the image display unit, photographing state inspecting means for inspecting the state of the image photographing unit taking the image displayed on the image display unit, photographing direction control information generating means for generating control information for changing a photographing direction of the image photographing unit in accordance with the inspection result of the photographing state inspecting means, so as to move the position of a point to the center of the screen of the image display unit, and control information informing means for informing the image photographing unit of the control information generated by the photographing direction control information generating means. Accordingly, only by designating a desired point on a displayed image, the photographing direction of the image photographing unit can be changed in the direction intended by an operator, facilitating a control operation for changing the photographing direction of the image photographing unit toward a desired object displayed on the image display unit.

Still further, the TV conference system further includes area designating means for designating an arbitrary area on an image displayed on the image display unit, and photographing area control information generating means for generating control information for the photographing area of the image photographing unit so as to match the area designated by the area designating means. Accordingly, only by designating a desired area on an image, the photographing area of the image photographing unit can be changed in conformity with the intention of an operator, facilitating control operations for the photographing direction and zooming of the image photographing unit so as to form a suitable image of an object displayed on the image display unit.

Further, the TV conference system further includes focal position control information generating means for generating control information for setting a focal position of the image photographing unit to a point designated by the position designating means. Accordingly, only by designating a desired point on an image, the focal position of the image photographing unit can be changed matching the intention of an operator, facilitating a control operation of focusing a desired object displayed on the image display unit.

Still further, in the TV conference system, a plurality of image photographing unit blocks may be provided and the image display unit may be divided into a plurality of display unit blocks, wherein image photographing unit discriminating means is provided for discriminating an image photographing unit from the plurality of image photographing units, which unit corresponds to the display unit on which the image with the designated point or area is displayed, and the image photographing unit discriminating means informs the image photographing unit discriminated by the image photographing unit discriminating means of control information. Accordingly, a proper control of the image photographing unit is possible.even if an operator does not consider which image photographing unit among the plurality of image photographing units is to be controlled.

Furthermore, if there are a plurality of selectable controls for the image photographing unit in response to a point designated on an image displayed on the image display unit, control selecting means is provided for selecting a control to be applied to the image photographing unit among the plurality of controls. Accordingly, a particular control can be designated and selected from the plurality of controls.

Figure 11:
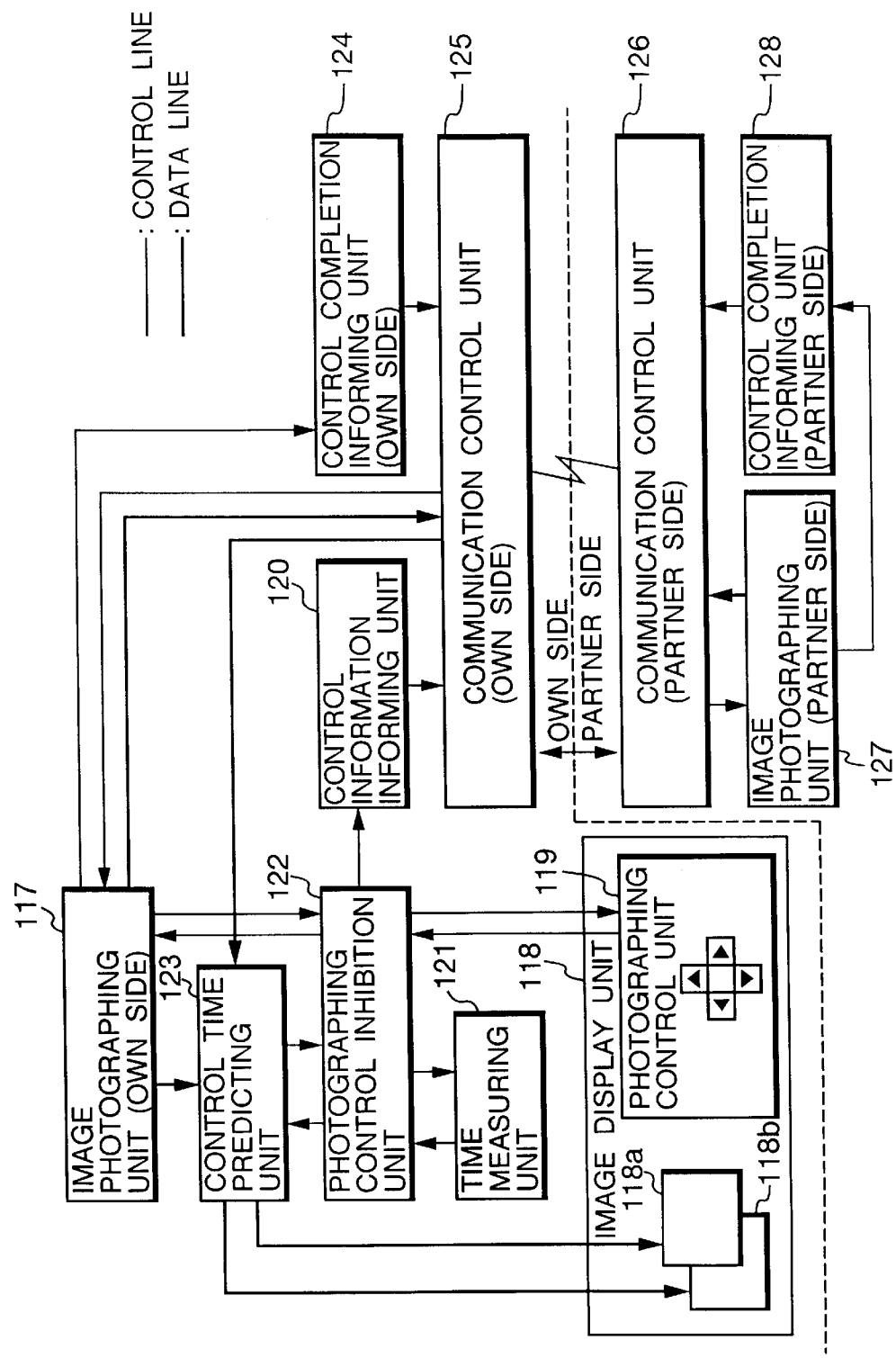
FIG. 11 is a block diagram showing the main circuit portions of the second embodiment of the invention.

FIG. 11 is a block diagram showing the structure of the second embodiment of the invention.

Referring to FIG. 11, an image communication system at the own side station is constituted by an image communication apparatus having a self-portrait photographing unit 117 and an image display unit 118 and other units 119 to 125. The image communication system includes various units shown in FIG. 12 other than the units 117 to 125, which are not depicted in FIG. 1.

An image communication system at the partner side station is constructed in the similar manner to the system at the own side station, the units shown in FIG. 11 including only a communication control unit 126 for data transfer to and from the own-side station communication system over a communication line, a partner portrait photographing unit 127 for photographing an image at the partner side station, and a control completion informing unit 128 for informing a completion of the control of the image photographing unit at the partner side station. Image data and a plenty of control information are transmitted and received between own side and partner side stations to perform, for example, a TV conference.

Referring to FIG. 11, in accordance with the notified control information, the self-portrait photographing unit 117 and the partner portrait photographing unit 127 execute a process for changing a photographing state (photographing direction, photographing area, focal position, and so on). The image photographing units 117 and 127 include an unrepresented controller which receives the control information and executes the process for changing the photographing state. When the control of the photographing state is completed by using the received control information, control completion information is supplied to a photographing control inhibition unit 122 or a control completion information unit 124, depending upon which station has transmitted the control information.

An image photographed by the self-portrait photographing unit 117 is supplied via a controlling time predicting unit 123 to a self-portrait display window 118a of the image display unit 118 to display the image thereon, and is also supplied via a communication control unit 125 to the partner side station to display the image on an unrepresented image display unit at the partner side station. An image photographed by the partner portrait photographing unit 127 is displayed on the unrepresented image display unit at the partner side station, and also supplied via the communication control unit 126 to the own side station to display the image on a partner portrait display window 118b. The controlling time predicting unit 123 measures and records frame intervals of a self-portrait image or partner portrait image sent from the self-portrait photographing unit 117 or communication control unit 125, to calculate an average time interval of the transferred image, and also to calculate the time required for completing the photographing state control of the image photographing unit in accordance with the control information informed by the control information informing unit 120. In this manner, the controlling time predicting unit 123 predicts a time from the transmission of the photographing state control information to the display of a new image on the image display unit 118 after the photographing state control of the image photographing unit is completed in accordance with the control information.

Reference numeral 119 represents a photographing control unit displayed in the form of graphic patterns on the image display unit 118, the photographing control unit having buttons or the like for controlling the self-portrait photographing unit 117 or partner portrait photographing unit 127. An operator manipulates a button of the photographing control unit 119 with an input device such as a mouse (not shown) to control the self-portrait photographing unit 117 or partner portrait photographing unit 127.

Control information inputted from the photographing control unit 119 is informed to the photographing control inhibition unit 122 which in turn informs the control information to either the self-portrait photographing unit 117 or control information informing unit 120, depending upon the contents of the control information. The control information informed to the control information informing unit 120 is further informed via the communication control unit 125 to the partner portrait photographing unit 127 to control the photographing state thereof. At the same time when the control information is informed, the photographing control unit 119 informs the photographing control unit 119 of a command for disabling the photographing control unit 119. Upon reception of this command, the photographing control unit 119 changes its displayed image to a disabled button image.

There are two cases where the photographing control inhibition unit 122 releases the manipulation inhibition state of the photographing control unit 119, as described in the following. In one case, the manipulation inhibition state is released when the self-portrait photographing unit 117 or partner portrait photographing unit 127 receives completion information of the photographing state control informed via the control completion information unit 128. In the other case, the manipulation inhibition state is released when a time measuring unit 121 counts up a predicated control time inquired from the control time predicting unit 123. The predicted control time is a time required for a frame to be displayed on the image display unit 118 after the photographing state control of the image photographing unit 117, 127 is completed in accordance with the received control information. A manipulation inhibition release is informed from the photographing control inhibition unit 22 to the photographing control unit 119 which in turn changes its displayed image to a button enabled image.

In this embodiment, with the same structure shown in FIG. 2, the video interface unit 9 and system control unit 14 realizes the operations of the photographing control unit 119, control information informing unit 120, time measuring unit 121, photographing control inhibition unit 122, control time predicting unit 123, and control completion informing unit 124, respectively shown in FIG. 11.

Figure 12:
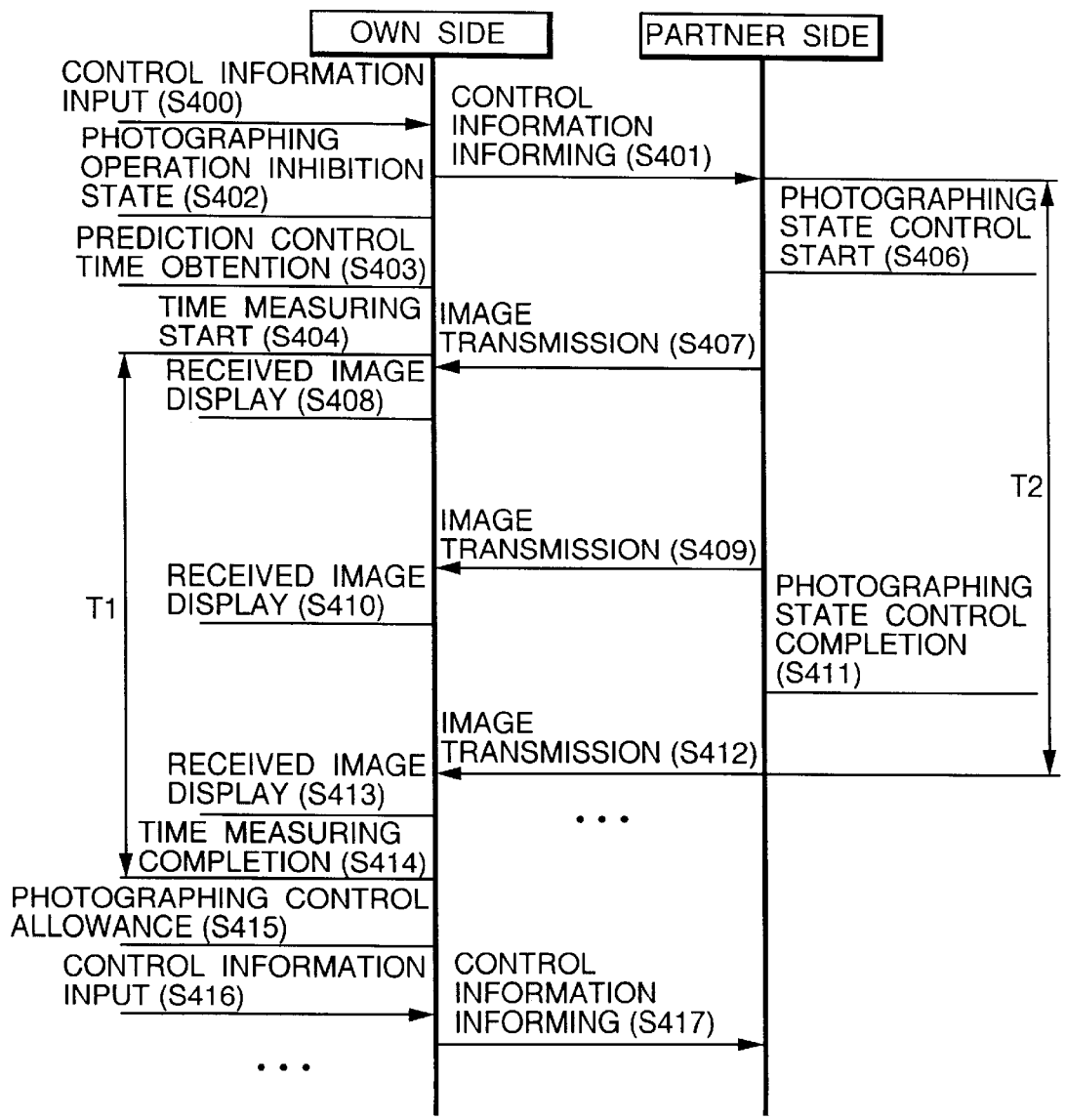
FIG. 12 is a sequence chart illustrating a process flow when the photographing control inhibition unit is controlled by the control time predicting unit and time measuring unit in the TV conference system of this embodiment.

FIG. 12 is a sequence chart illustrating a process flow when the photographing control inhibition unit is controlled by the control time predicting unit and time measuring unit in the TV conference system of this embodiment. The process flow of this sequence chart will be described with reference to the block diagram shown in FIG. 11.

Referring to FIG. 12, at Step S400 as an operator inputs photographing state control information of the partner portrait photographing unit 127 to the photographing control unit 119, the inputted information is transmitted at Step S401 to the partner side station via the photographing control inhibition unit 122, control information notifying unit 120, and communication control unit 125. Then, at the own side station, the photographing control inhibition unit 122 disables the photographing control unit 119 at Step S402, and a predicted control time (T1) is received from the control time predicting unit 123 at Step S403. The predicted control time is a predicted time required for completing the designated control, and is a time period until an image is received after the control of the partner portrait photographing unit 127 is completed. In this case, if a state display on the photographing control unit 119 is a graphic representation, its graphic representation is changed to a graphic representation indicating a manipulation inhibition state. For example, the icon for a camera control shown in FIG. 11 is changed to a graphic representation indicating a manipulation inhibition state. At Step S401, the time measuring unit 121 starts counting the predicted control time to check whether the predicted control time has lapsed. The manipulation inhibition state of the photographing control unit 119 is maintained until the predicted control time has lapsed.

At the partner side station, in accordance with the photographing state control information informed at Step S401, the photographing state control (e.g,.camera tilt) of the partner portrait photographing unit 127 starts at Step S406 when the photographing state control information is received. In this case, an image while the photographing state is changed (e.g., camera is tilted) is transmitted to the own side station as illustrated at Steps S407 and S409 to display it on the image display unit 118 at the own side station at Steps S408 and S410. In this example, the photographing state control of the image photographing unit 127 at the partner station is completed at Step S411. Therefore, an image transmitted at Step S412 is the first image. The time from when the photographing state control information is transmitted to the partner side station at Step S401 to when the first image is transmitted to the own side station after the control completion of the partner portrait photographing unit 127 is represented by T2.

When the count of the predicted control time T1 by the time measuring unit 121 is completed at Step S414, the photographing control inhibition unit 122 releases the manipulation inhibition state of the photographing control unit 119. If a state display on the photographing control unit 119 is a graphic representation, its graphic representation is changed to the graphic representation indicating a manipulation inhibition released state, such as shown in FIG. 11.

Similar to Steps S400 and S401, an input of photographing state control information by an operator becomes possible at Step S416, the control information is transmitted to the partner side station at Step S417, and similar operations are repeated.

In the above description, the predicted control time T1 is assumed to be longer than the time T2.

Figure 13:
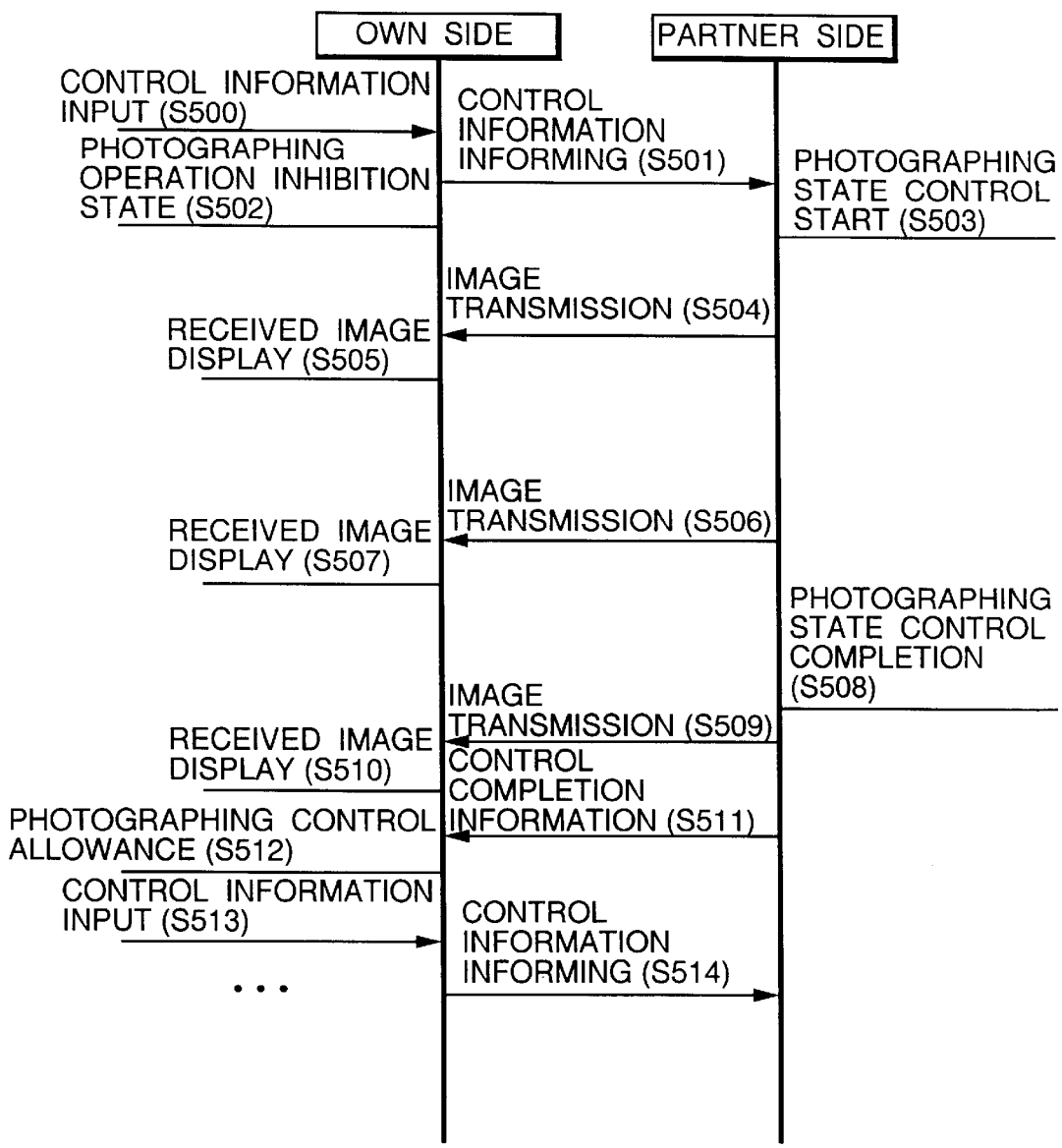
FIG. 13 is a sequence chart illustrating a process flow when the photographing control inhibition unit is controlled by the control completion informing unit in the TV conference system of this embodiment.

FIG. 13 is a sequence chart illustrating a process flow when the photographing control inhibition unit is controlled by the control completion informing unit in the TV conference system of this embodiment. The process flow of this sequence chart will be described with reference to the block diagram shown in FIG. 11.

Referring to FIG. 13, at Step S500 as an operator inputs photographing state control information of the partner portrait photographing unit 127 to the photographing control unit 119, the inputted information is transmitted at Step S501 to the partner side station via the photographing control inhibition unit 122, control information notifying unit 120, and communication control unit 125. Then, at the own side station, the photographing control inhibition unit 122 disables the photographing control unit 119 at Step S502. In this case, if a state display on the photographing control unit 119 is a graphic representation, its graphic representation is changed to a graphic representation indicating a manipulation inhibition state.

At the partner side station, in accordance with the photographing state control information informed at Step S501, the photographing state control (e.g, camera tilt) of the partner portrait photographing unit 127 starts at Step S503 when the photographing state control information is received. In this case, an image while the photographing state is changed (e.g., camera is tilted) is transmitted to the own side station as illustrated at Steps S504 and S506 to display it on the image display unit 118 at the own side station at Steps S505 and S507. In this example, the photographing state control of the image photographing unit 127 at the partner station is completed at Step S508. Therefore, an image transmitted at Step S509 is the first image. The first image is displayed on the image display unit 118 at the own side station at Step S510.

At the partner side station, when the first image is transmitted at Step S509 after the photographing state control is completed, a photographing state control completion is transmitted at Step S511 to the own side station via the control completion informing unit 128 and communication control unit 126. Upon reception of the control completion, the image photographing control inhibition unit 122 at the own side station releases at Step S511 the manipulation inhibition state of the photographing control unit 119 set at Step S502. If a state display on the photographing control unit 119 is a graphic representation, its graphic representation is changed to the graphic representation indicating a manipulation inhibition released state.

Similar to Steps S500 and S501, an input of photographing state control information by an operator becomes possible at Step S513, the control information is transmitted to the partner side station at Step S514, and similar operations are repeated.

Figure 14:
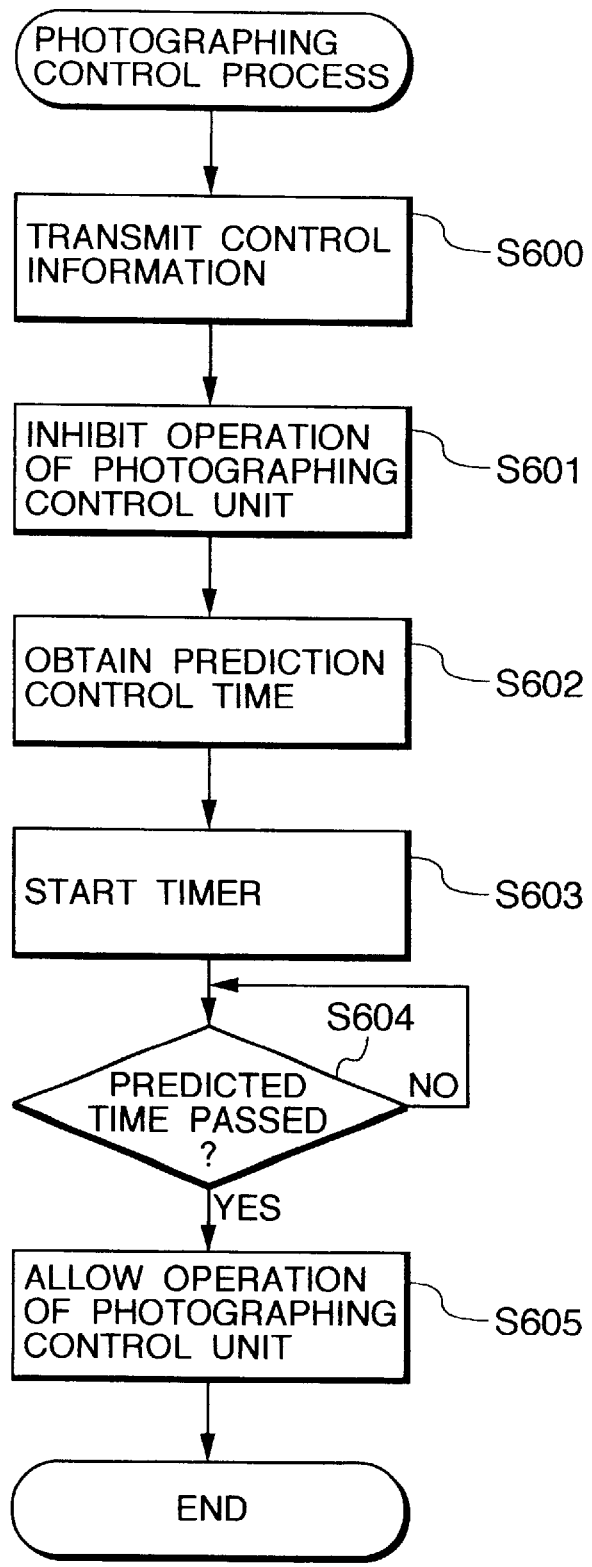
FIG. 14 is a flow chart illustrating a process flow when control information is inputted from the photographing control unit while the photographing control inhibition unit is controlled by the control time predicting unit and time measuring unit in the TV conference system of this embodiment.

FIG. 14 is a flow chart illustrating an operation when control information is inputted from the photographing control unit while the photographing control inhibition unit is controlled by the control time predicting unit and time measuring unit in the TV conference system of this embodiment. The process of this flow chart will be described with reference to the block diagram shown in FIG. 11.

Referring to FIG. 14, at Step S600 as an operator inputs photographing state control information of the partner portrait photographing unit 127 to the photographing control unit 119, the inputted information is transmitted to the partner side station via the photographing control inhibition unit 122, control information notifying unit 120, and communication control unit 125, and the flow advances to Step S601.

At Step S601, the photographing control inhibition unit 122 informed of the control information at Step S600 sets the manipulation inhibition state of the photographing control unit 119, and the flow advances to Step S602.

At Step S602, the photographing control inhibition unit 122 receives the predicted control time from the control time predicting unit 123, the predicted control time being a time required for the transmission of an image after the control of the partner portrait photographing unit 127 is completed in accordance with the received control information. Then, the flow advances to Step S603.

At Step S603, the time measuring unit 121 starts counting up the predicted control time received at Step S602, and the flow advances to Step S604.

At Step S604, the time count started at Step S603 is checked, and if the predicted control time received at Step S602 has lapsed (Yes at Step S604), then the flow advances to Step S605, whereas if not (No at Step S604), the process at Step S604 is repeated.

At Step S605, the manipulation inhibition state of the photographing control unit set at Step S601 is released to terminate the process flow.

FIG. 15 is a flow chart illustrating an operation when control information is inputted from the photographing control unit while the photographing control inhibition unit is controlled by the control completion informing unit in the TV conference system of this embodiment. The process of this flow chart will be described with reference to the block diagram shown in FIG. 11.

Referring to FIG. 15, at Step S700 as an operator inputs photographing state control information of the partner portrait photographing unit 127 to the photographing control unit 119, the inputted information is transmitted to the partner side station via the photographing control inhibition unit 122, control information notifying unit 120, and communication control unit 125, and the flow advances to Step S701.

At Step S701, the photographing control inhibition unit 122 informed of the control information at Step S700 sets the manipulation inhibition state of the photographing control unit 119, and the flow advances to Step S702.

At Step S702, it is checked whether the photographing state control of the partner portrait photographing unit has been completed in accordance with the control information informed at Step S700 and whether the partner side station has transmitted an image after the photographing state control completion. If the control completion has been informed (Yes at Step S702), the flow advances to Step S703, whereas if not (No at Step S702), the process at Step S702 is repeated.

At Step S703, the manipulation inhibition state of the photographing control unit set at Step S701 is released to terminate the process flow.

FIG. 16 is a flow chart illustrating an operation when control information is inputted from the photographing control unit while the photographing control inhibition unit is controlled by the control completion informing unit in the TV conference system of this embodiment. The process of this flow chart will be described with reference to the block diagram shown in FIG. 11.

Referring to FIG. 16, at Step S800 the control of the image photographing unit 117 starts in accordance with control information received from the partner side station, and the flow advances to Step S801.

At Step S801, it is checked whether the control (e.g., camera tilt) of the image photographing unit 117 started at Step S800 has completed. If completed (Yes at Step S801), the flow advances to Step S802, whereas if not (No at Step S801), the process at Step S801 is repeated.

At Step S802, it is checked whether the image photographing unit 117 has transmitted a new image to the partner side station via the communication control unit 125 after the control completion of the image photographing unit 117 detected at Step S801. If transmitted (Yes at Step S802), the flow advances to Step S803, whereas if not (No at Step S802), the process at Step S802 is repeated. In the structure shown in FIG. 11, it is assumed that after an image is transmitted after the control completion, the image photographing unit 117 informs the control completion informing unit 124 of an image transmission completion.

At Step S803, the control completion informing unit 124 informs the communication control unit 125 of a transmission of an image after the control completion of the image photographing unit 117 in accordance with the received control information by which the process flow is activated. Thereafter, the process flow is terminated.

As described above, the TV conference system of this embodiment includes an image photographing unit capable of being remotely controlled by control information, an image display unit for displaying an image photographed by the image photographing unit, a photographing control unit for remotely controlling the image photographing unit, control information informing means for informing the image photographing unit of control information inputted by the photographing control unit, a time measuring unit for counting a predetermined lapse time after the control information informing means informs the control information, and photographing control inhibition means for disabling the photographing control unit until the time measuring unit counts up the predetermined lapse time after the control information informing unit transmits the control information. Accordingly, the photographing control unit can be disabled for the predetermined time after the control information of a photographing state is transmitted to the image photographing unit at the partner side station. It is also possible to prevent inadvertently depressing an operation key of the photographing control unit and thereby facilitate the system operation, because an image is transmitted while the photographing state of the image photographing unit at the partner side is changed.

Further, according to another aspect of the embodiment, the TV conference system further includes control time predicting means for predicting a time from when the control of the image photographing unit is completed in accordance with the control information informed by the control information informing unit to when a new image is transmitted after the control completion, wherein the predetermined lapse time counted by the time measuring unit is set longer than a control time predicted by the control time predicting means. Accordingly, the time period while the photographing control unit is disabled after the photographing state control information is transmitted to the image photographing unit, can be automatically calculated. Therefore, an operator is not required to consider the time period while the photographing control unit is disabled, facilitating the system operation.

Still further, according to still another aspect of this embodiment, the TV conference system includes an image photographing unit capable of being remotely controlled by control information, an image display unit for displaying an image photographed by the image photographing unit, a photographing control unit for remotely controlling the image photographing unit, control information informing means for informing the image photographing unit of control information inputted by the photographing control unit, control completion informing means for informing the station received the control information of a control completion after a frame is transmitted after the control completion of the image photographing unit by the received control information, and photographing control prohibition means for disabling the photographing control unit during the time from when the control information informing means informs the control information to when the control completion is received from the control completion informing means. Accordingly, the photographing control unit can be disabled during the time from when the control of the image photographing unit at the partner side station is completed in accordance with the control information of a photographing state to when the control completion is received after an image is transmitted. It is therefore possible to prevent inadvertently depressing an operation key of the photographing control unit and thereby facilitate the system operation, because an image is transmitted while the photographing state of the image photographing unit at the partner side is changed.

Furthermore, according to another aspect of the embodiment, the photographing control unit is realized by a graphical user interface displayed on the image display unit, and the graphic representation of the photographing control unit is changed depending upon whether the photographing control inhibition means has disabled the photographing control unit. Accordingly, it is possible to visually display a manipulation inhibition state of the photographing control unit, and an operator can know easily whether the photographing control unit can be used or not.

What is claimed is:

1. An image communication apparatus comprising:
    a command generator for generating a command for controlling a communication partner, to cause a part of the communication partner to move mechanically, the command being transmitted through a communication line; and
    a prevention unit for preventing the communication partner from operating incorrectly according to a command that is transmitted after a predetermined delay time of the communication line,
    wherein said prevention unit includes a designation unit for directly designating a position of an image of a whole scene displayed on a display unit, the image being transmitted from the communication partner.

2. An image communication apparatus according to claim 1, wherein said prevention unit further includes:
    a generator prevention unit for preventing said command generator from generating another command at least within the predetermined delay time after said command generator generates the command.

3. An image communication apparatus according to claim 1, further comprising:
    a receiver for receiving, from the communication partner, a status according to the command transmitted to the communication partner,
    wherein said prevention unit prevents said command generator from generating another command until said receiver receives the status.

4. An image communication apparatus according to claim 1, wherein the communication line is a public line.

5. An image communication apparatus according to claim 1, wherein the communication line is a wireless communication channel.

6. An apparatus according to claim 1, wherein
    the communication partner includes an image pickup unit, and
    the part of the communication partner that is caused to move mechanically in accordance with the command is a mechanical part that changes an image pickup area of the image pickup unit.

7. An apparatus according to claim 6, wherein the mechanical part changes the image pickup area by controlling a focal length of a lens of the image pickup unit.

8. An image communication method, said method comprising the steps of:
    generating a command for controlling a communication partner, to cause a part of the communication partner to move mechanically, the command being transmitted through a communication line; and
    preventing the communication partner from operating incorrectly according to a command that is transmitted after a predetermined delay time of the communication line,
    wherein said preventing step includes the step of directly designating a position of an image of a whole scene displayed on a display unit, the image being transmitted from the communication partner.

9. An image communication method according to claim 8, wherein said preventing step further includes:
    a command generation prevention step of preventing generation of another command at least within the predetermined delay time after said generating step generates the command.

10. An image communication method according to claim 8, further comprising the step of receiving, from the communication partner, a status according to the command transmitted to the communication partner, wherein said preventing step prevents said generating step from generating another command until the status is received.

11. An image communication method according to claim 8, wherein the communication line is a public line.

12. An image communication method according to claim 8, wherein the communication line is a wireless communication channel.

13. Am image communication method according to claim 8, wherein
    the communication partner includes an image pickup unit, and
    the part of the communication partner that is caused to move mechanically in accordance with the command is a mechanical part that changes an image pickup area of the image pickup unit.

14. An image communication method according to claim 13, wherein the mechanical part changes the image pickup area by controlling a focal length of a lens of the image pickup unit.

* * * * *

UNITED STATES PATENT AND TRADEMARK OFFICE
CERTIFICATE OF CORRECTION

PATENT NO.      : 6,320,614 B1
DATED           : November 20, 2001
INVENTOR(S)     : Masanori Kawashimia It is certified that error appears in the above-identified patent and that said Letters Patent is hereby corrected as shown below:

Column 2,
Line 37, "views" should read -- viewed --.

Column 3,
Line 4, "making" should read -- making it --.

Column 11,
Line 54, "command" should read -- commands --.
Line 64, "numeral" should read -- numeral 803 --.

Column 15,
Line 6, "predicated" should read -- predicted --.

Column 9,
Line 19, "tion" should read -- tion that --.

Signed and Sealed this

Twenty-first Day of May, 2002

Attest:

JAMES E. ROGAN
*Attesting Officer*  *Director of the United States Patent and Trademark Office*